(12) United States Patent
Kobayashi et al.

(10) Patent No.: US 8,958,069 B2
(45) Date of Patent: Feb. 17, 2015

(54) SPECTRAL COLORIMETRIC APPARATUS AND IMAGE FORMING APPARATUS INCLUDING THE SAME

(71) Applicant: Canon Kabushiki Kaisha, Tokyo (JP)

(72) Inventors: Hisanori Kobayashi, Odawara (JP); Shin Komori, Gotemba (JP); Mitsuhiro Obara, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/889,714

(22) Filed: May 8, 2013

(65) Prior Publication Data

US 2013/0242299 A1    Sep. 19, 2013

Related U.S. Application Data

(63) Continuation of application No. 13/281,248, filed on Oct. 25, 2011, now Pat. No. 8,462,342.

(30) Foreign Application Priority Data

Oct. 28, 2010  (JP) ................................. 2010-242219
Oct. 28, 2010  (JP) ................................. 2010-242220

(51) Int. Cl.
*G01J 3/46*    (2006.01)
*G01J 3/28*    (2006.01)
*G01J 3/02*    (2006.01)
*G01J 3/50*    (2006.01)
*G01J 3/04*    (2006.01)
*G01J 3/20*    (2006.01)

(52) U.S. Cl.
CPC .............. *G01J 3/502* (2013.01); *G01J 3/2803* (2013.01); *G01J 3/02* (2013.01); *G01J 2003/2866* (2013.01); *G01J 3/28* (2013.01); *G01J 3/0248* (2013.01); *G01J 3/50* (2013.01); *G01J 3/04* (2013.01); *G01J 3/20* (2013.01); *G01J 3/0237* (2013.01)
USPC .......................................................... 356/402

(58) Field of Classification Search
USPC .................................................. 356/402–425
See application file for complete search history.

(56) References Cited

U.S. PATENT DOCUMENTS

| 5,343,289 | A * | 8/1994 | Crawford et al. ............. 356/328 |
| 6,606,156 | B1 | 8/2003 | Ehbets |
| 2007/0182961 | A1 | 8/2007 | Chadha |

FOREIGN PATENT DOCUMENTS

| CN | 101409299 A | 4/2009 |
| CN | 201252099 Y | 6/2009 |
| EP | 90218 A1 | 10/1983 |
| EP | 489286 A2 | 6/1992 |

(Continued)

*Primary Examiner* — Abdullahi Nur
(74) *Attorney, Agent, or Firm* — Canon USA Inc IP Division

(57) ABSTRACT

A spectral colorimetric apparatus includes a housing which includes a side wall. An outer surface of the side wall is an adjustment surface capable of adjusting a position of a linear sensor by moving while attaching the linear sensor to the adjustment surface. The linear sensor is supported by the side wall of the housing while abutting on the adjustment surface and receives a light beam that is dispersed by a concave surface reflection type diffraction element and passes through an opening portion. The adjustment surface is parallel to a tangential line at a part of a Rowland circle of the concave surface reflection type diffraction element, through which a light beam received by the linear sensor passes.

8 Claims, 26 Drawing Sheets

(56) References Cited

FOREIGN PATENT DOCUMENTS

| | | | |
|---|---|---|---|
| EP | 1041372 A1 | 10/2000 |
| EP | 2042844 A2 | 4/2009 |
| JP | 63-075523 A | 4/1988 |
| JP | H04-015408 B | 3/1992 |
| JP | H05-080273 A | 4/1993 |
| JP | H08-292390 A | 11/1996 |
| JP | H09-105673 A | 4/1997 |
| JP | 2001-235368 A | 8/2001 |
| JP | 2001-311664 A | 11/2001 |
| JP | 2004-309146 A | 11/2004 |
| JP | 2007-127473 A | 5/2007 |
| JP | 2007-327923 A | 12/2007 |
| JP | 2009-075515 A | 4/2009 |
| JP | 2010-210456 A | 9/2010 |

* cited by examiner

US 8,958,069 B2

SPECTRAL COLORIMETRIC APPARATUS AND IMAGE FORMING APPARATUS INCLUDING THE SAME

CROSS REFERENCE TO RELATED APPLICATIONS

The present application is a continuation of U.S. patent application Ser. No. 13/281,248, filed on Oct. 25, 2011, the content of which is expressly incorporated by reference herein in its entirety. This application also claims the benefit of Japanese Patent Applications No. 2010-242219 filed Oct. 28, 2010 and No. 2010-242220 filed Oct. 28, 2010, which are hereby incorporated by reference herein in their entirety.

BACKGROUND OF THE INVENTION

1. Field of the Invention

The present invention relates to an image forming apparatus, such as a copying machine and a laser beam printer (LBP), and, more particularly, to a spectral colorimetric apparatus that detects a light beam dispersed using a reflection type diffraction element, using a plurality of photoelectric conversion elements arranged in an array, so as to perform color discrimination or colorimetry on a subject.

2. Description of the Related Art

Sometimes, image forming apparatuses, for forming a color image, cause tint deviation in a color image. Particularly, in an electro-photographic system, due to change in usage environment and deterioration with age, transfer efficiency varies with colors, depending upon drum sensitivity, the charge capacity of the toner used, and the type of paper used. Thus, the color mixing ratio can deviate from a predetermined value which is likely to affect tint of the printed image.

Such a phenomenon occurs, so that tint may be changed due to difference among image forming apparatuses. Accordingly, there is a fear that consistency of the tint of a formed color image cannot be maintained. To solve such an issue, conditions for forming an image by an image forming apparatus are controlled by measuring the tint of a surface using a colorimetric apparatus. Thus, the consistency of the tint of a formed color image is maintained.

Japanese Patent Application No. 2009-110884 (i.e., Japanese Patent Application Laid-Open No. 2010-276599 discusses a colorimetric apparatus of the following configuration. The colorimetric apparatus is a spectral colorimetric apparatus that includes an illumination optical system for illuminating a test surface, a light guide optical system for guiding to a dispersing optical system a light beam reflected from the test surface, and the dispersing optical system for acquiring a spectral intensity distribution by dispersing the guided light beam.

To more accurately measure the tint of the test surface with such a spectral colorimetric apparatus, it is necessary to position the spectral colorimetric apparatus with a high degree of accuracy, with respect to the light beam reflected from the test surface, by adjusting the position and orientation of an optical member. In addition, it is necessary that: the smaller the spectral colorimetric apparatus is, the higher the accuracy of the adjustment of the position and orientation of the optical member becomes.

For example, if the illumination optical system, the light guide optical system, and the dispersing optical system are contained in one housing in order to miniaturize the apparatus, a space, into which tools are inserted for electrically connecting the systems and for multi-axial adjustment thereof, is narrowly limited so as not to touch other optical members. Accordingly, such operations are difficult to perform, and there is a fear of reduction in the productivity of the apparatus.

SUMMARY OF THE INVENTION

The present invention is directed to a spectral colorimetric apparatus that can be miniaturized while the productivity thereof is assured, and an image forming apparatus including the spectral colorimetric apparatus.

According to an aspect of the present invention, a spectral colorimetric apparatus includes a concave surface reflection type diffraction element configured to disperse an incident light beam, a linear sensor including a plurality of photoelectric conversion elements each configured to receive the light beam dispersed by the concave surface reflection type diffraction element, a housing which includes a side wall and configured to support the concave surface reflection type diffraction element and the linear sensor, and an opening portion formed in the side wall of the housing arranged such that the light beam dispersed by the concave surface reflection type diffraction element passes through the opening, wherein an outer surface of the side wall is operable as an adjustment surface capable of adjusting the position of the linear sensor by moving while abutting on the linear sensor, and the linear sensor is supported by the side wall of the housing while abutting on the adjustment surface and receives the light beam that is dispersed by the concave surface reflection type diffraction element and passes through the opening portion, and wherein the adjustment surface is parallel to a tangential line at apart of a Rowland circle of the concave surface reflection type diffraction element, through which a light beam received by the linear sensor passes.

Further features and aspects of the present invention will become apparent from the following detailed description of embodiments with reference to the attached drawings.

BRIEF DESCRIPTION OF THE DRAWINGS

The accompanying drawings illustrate embodiments, features, and aspects of the invention and, together with the description, serve to explain the principles of the invention.

7B illustrates the color sensor unit, which is viewed from obliquely above, at the adjustment of the linear sensor.

Figure 8:
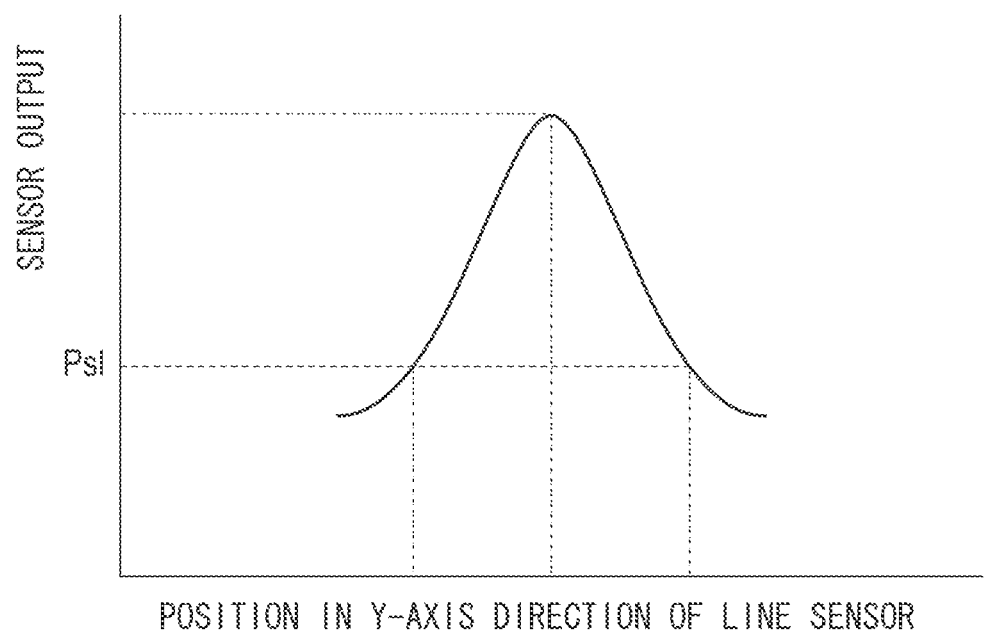

FIG. 8 is a graph illustrating an output of a light receiving element versus a position in a Y-axis direction of the linear sensor during an output operation of a monochromator.

Figure 9A:
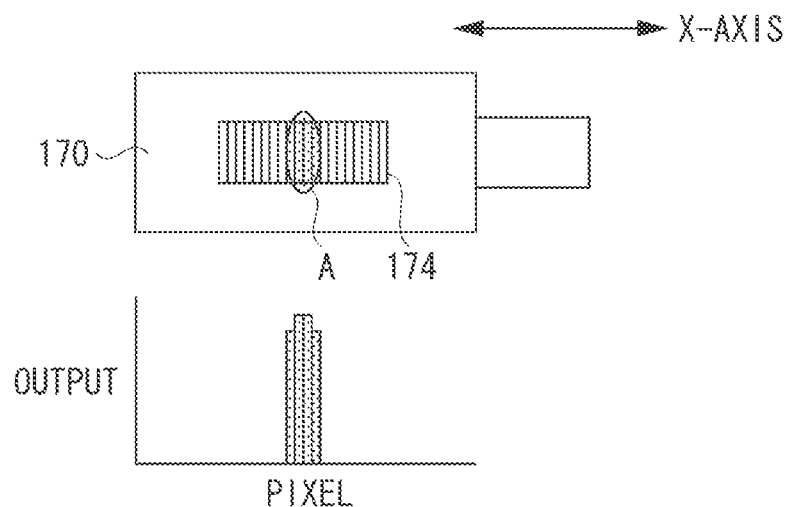
Figure 9B:
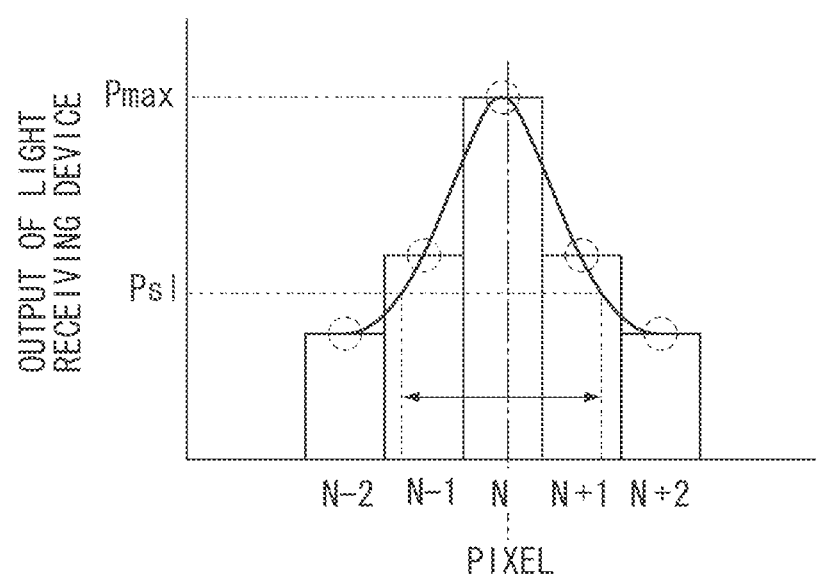
Figure 9C:
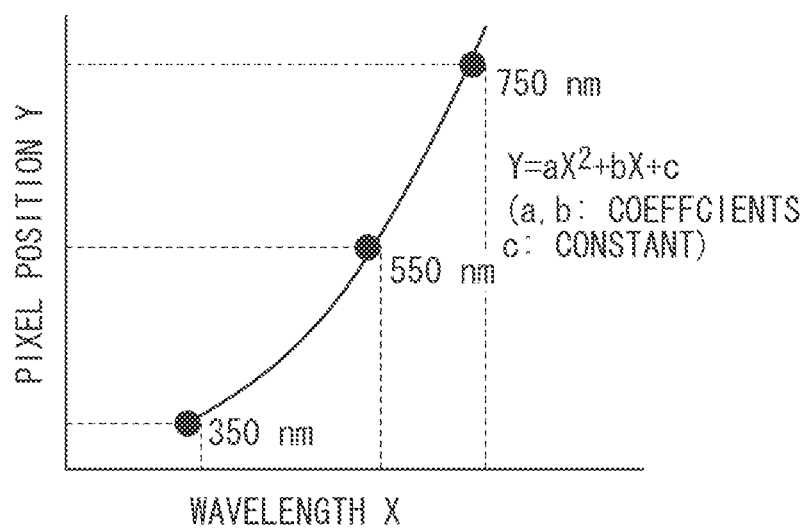

FIG. 9A illustrates a relation between a light receiving element of a linear sensor and an output therefrom. FIG. 9B is a graph illustrating an output of each pixel of the light receiving element when the monochromator outputs light of a predetermined single wavelength. FIG. 9C is a graph illustrating a relation between each pixel position of the linear sensor and a wavelength.

Figure 10:
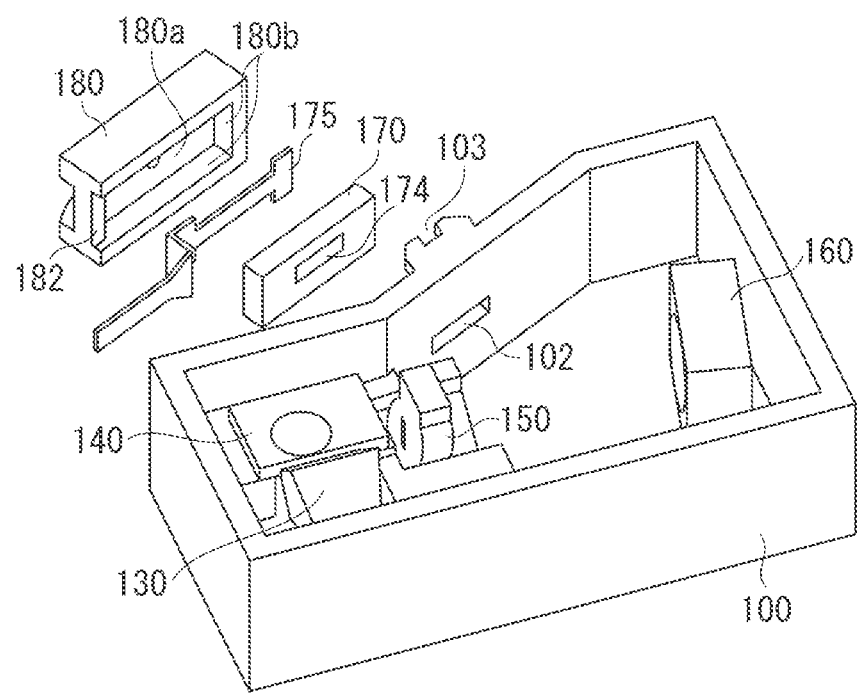

FIG. 10 schematically illustrates how the linear sensor is held by the housing.

Figure 11A:
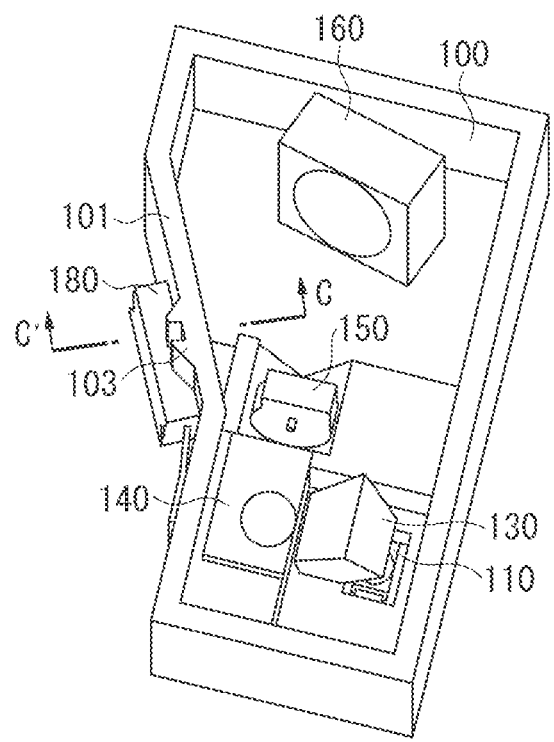
Figure 11B:
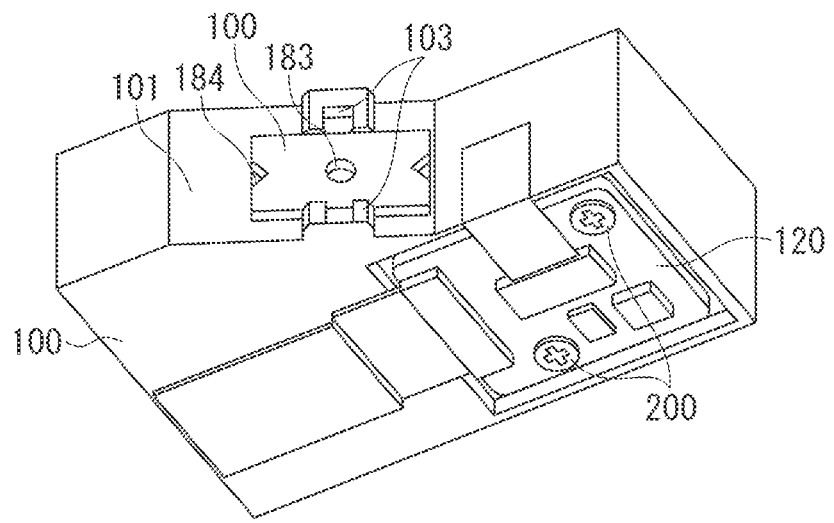

FIG. 11A illustrates a holding member attached to the housing, which is viewed from obliquely above. FIG. 11B illustrating the holding member attached to the housing, which is viewed from obliquely above.

Figure 12:
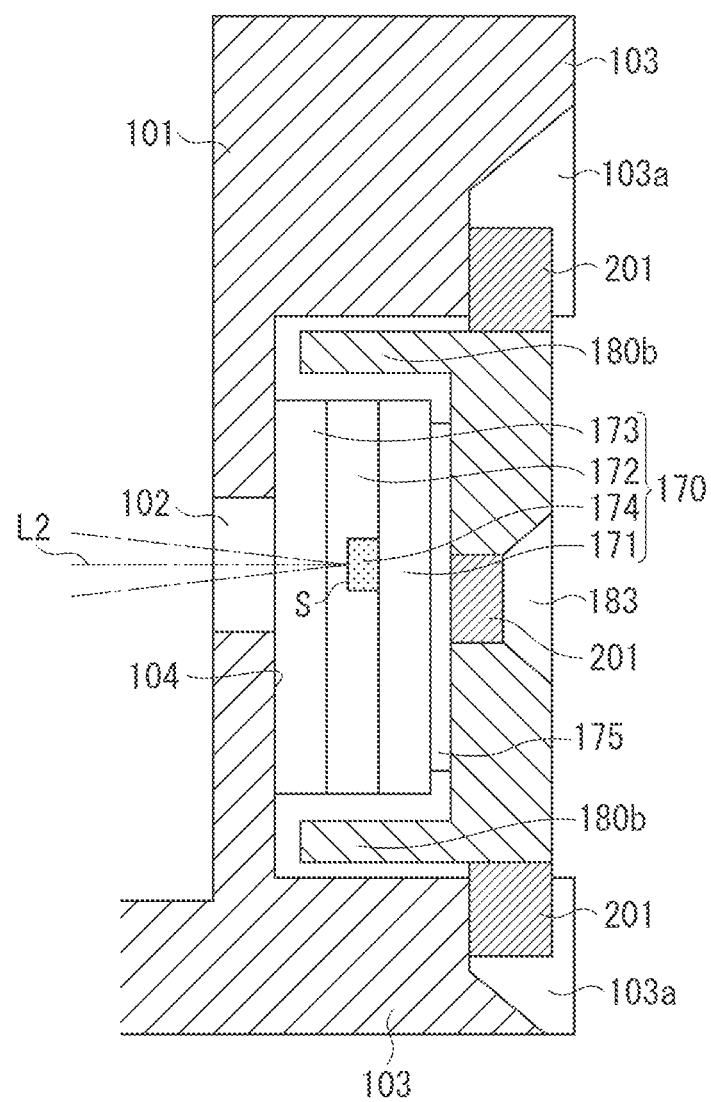

FIG. 12 is a cross-sectional diagram, taken on a line C-C' illustrated in FIG. 11A, illustrating a side wall when holding the linear sensor and the holding member.

Figure 13:
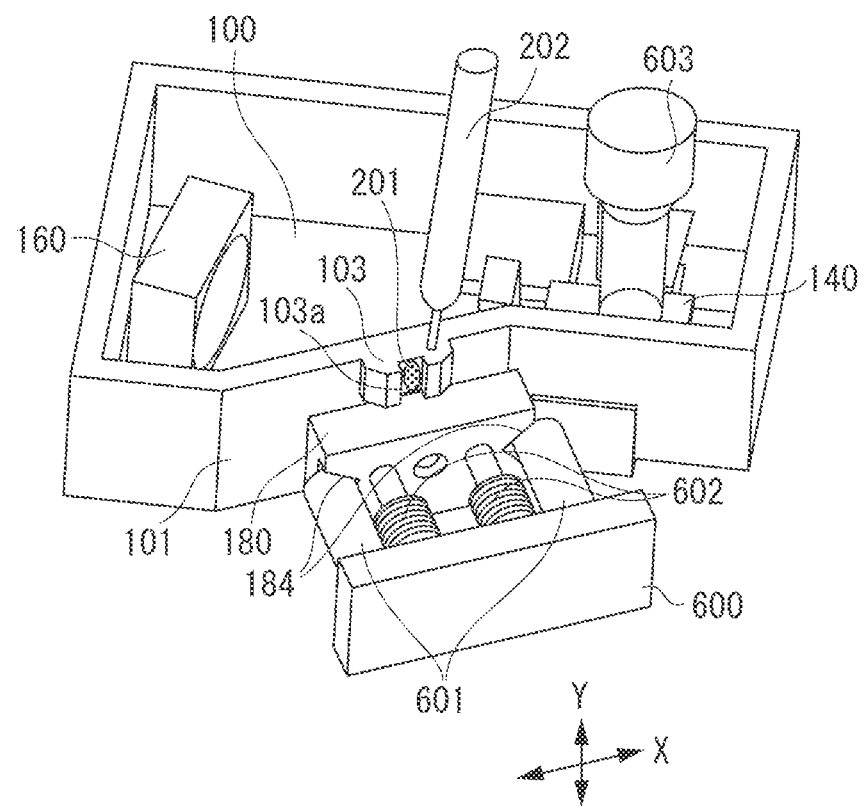

FIG. 13 illustrates the color sensor unit, which is viewed from obliquely above, at adjustment of the linear sensor.

Figure 14:
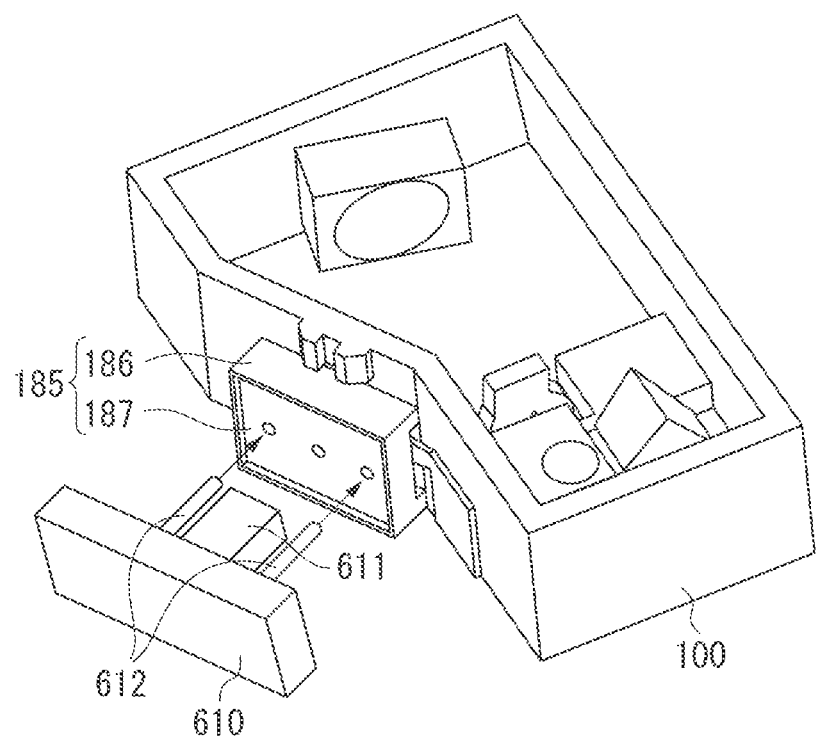

FIG. 14 illustrates another configuration of a holding member and a linear sensor adjustment tool.

Figure 15:
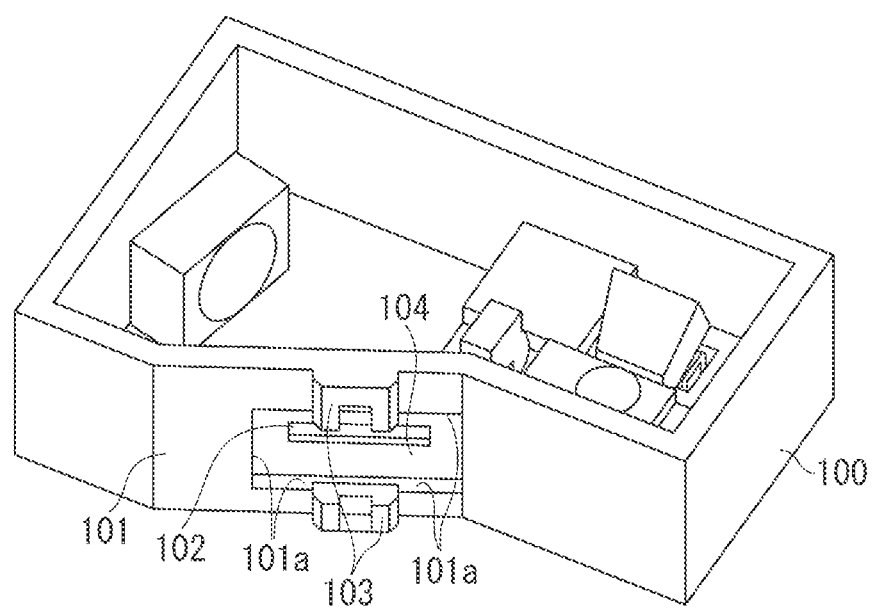

FIG. 15 illustrates another configuration of vicinity of an adjustment surface of a side wall.

Figure 16:
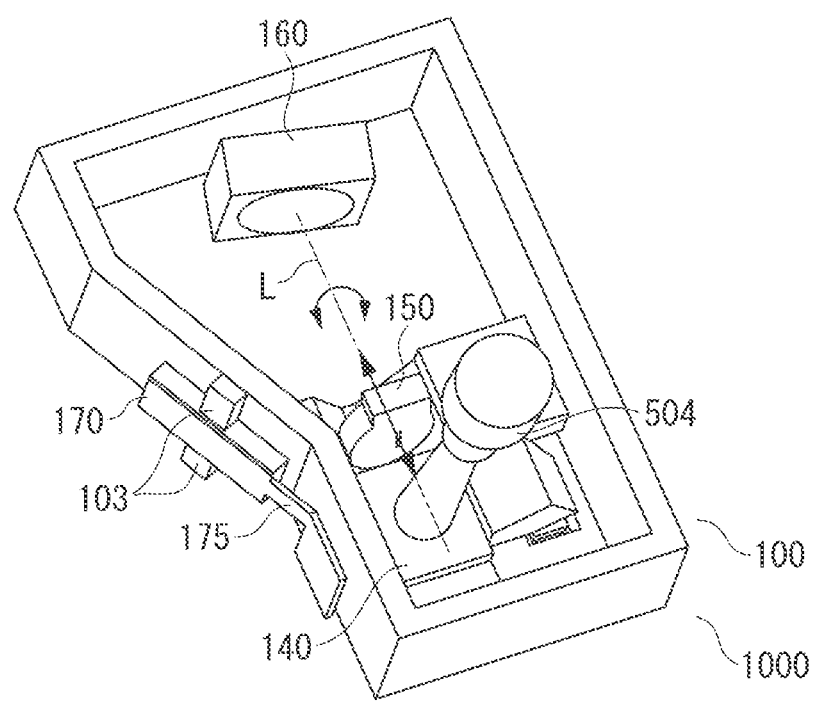

FIG. 16 illustrates a spectral colorimetric apparatus at adjustment of a position of a slit member.

Figure 17:
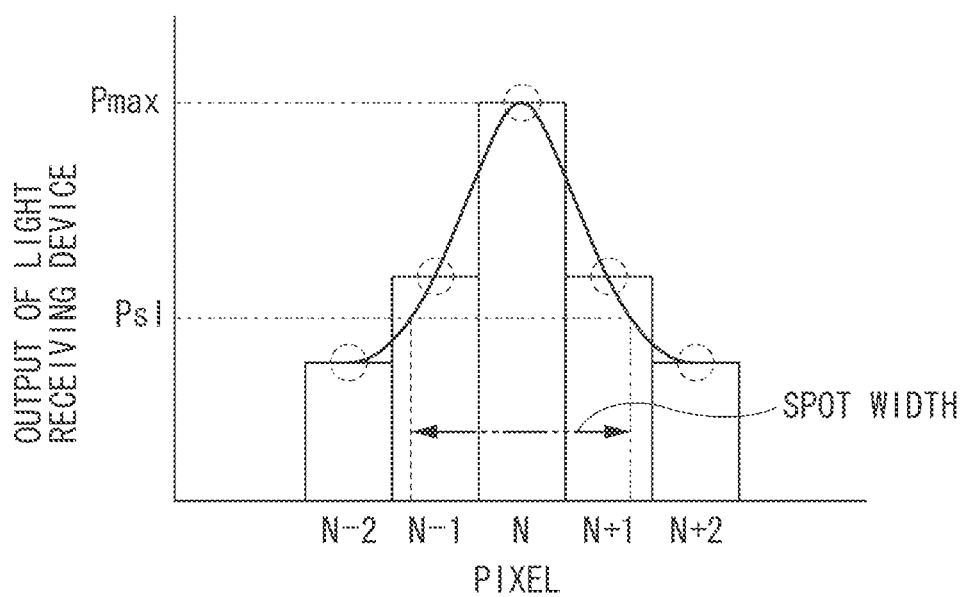

FIG. 17 is a graph illustrating an output from each pixel of a light receiving element on which a slit image is formed.

Figure 18A:
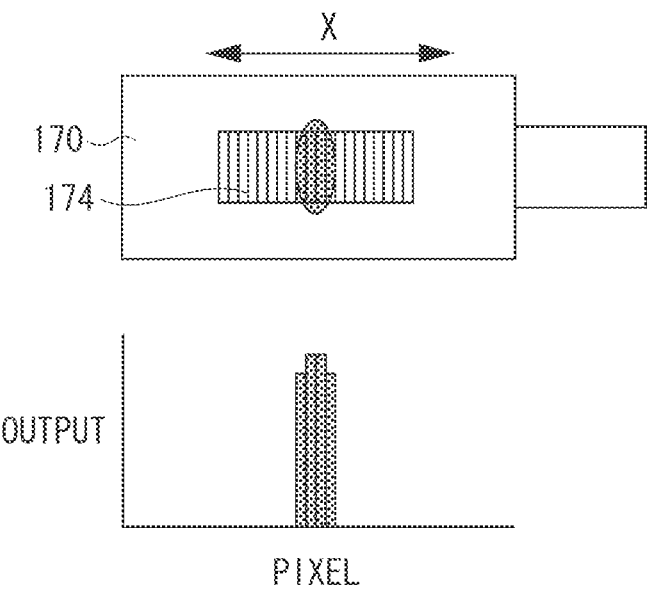
Figure 18B:
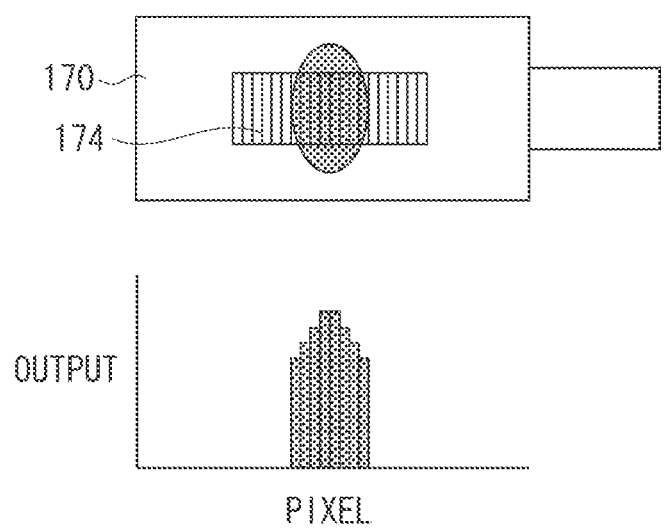
Figure 18C:
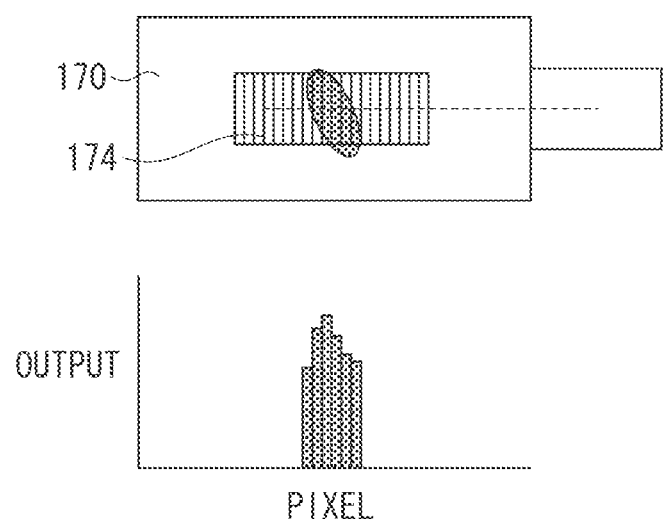

FIG. 18A is a diagram whose upper part illustrates a condition in which a slit image is formed in an ideal image formation state on a light receiving element of a linear sensor from a single wavelength light beam, and whose lower part illustrates an output of the light receiving element at that time. Each of FIGS. 18B and 18C is a diagram whose upper part illustrates a condition in which a slit image is formed in a non-ideal image formation state on the light receiving element of the linear sensor from a single wavelength light beam, and whose lower part illustrates an output of the light receiving element at that time.

Figure 19A:
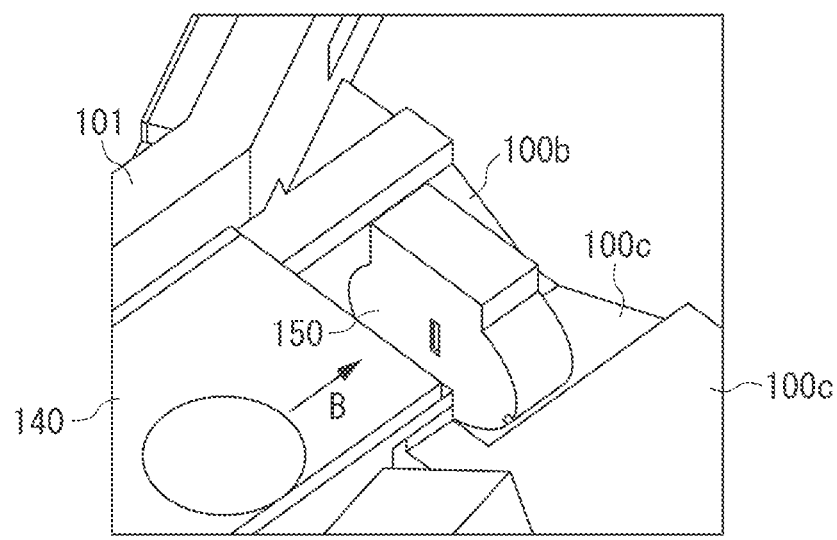
Figure 19B:
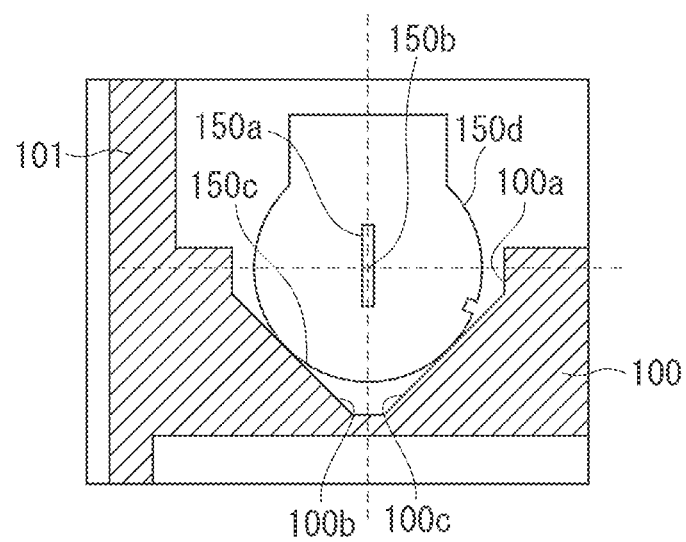

FIG. 19A is a perspective view illustrating a neighborhood portion of a slit in a spectral colorimetric apparatus. FIG. 19B is a cross-sectional diagram, taken from a direction indicated by an arrow B illustrated in FIG. 7A, illustrating the neighborhood portion in the slit of the spectral colorimetric apparatus.

Figure 20A:
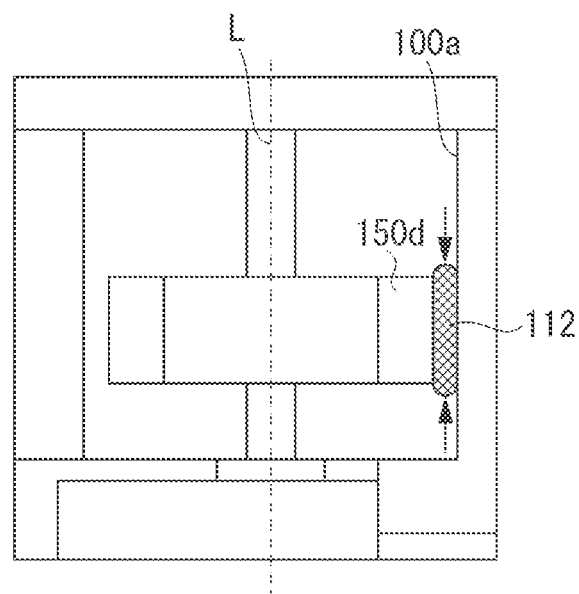
Figure 20B:
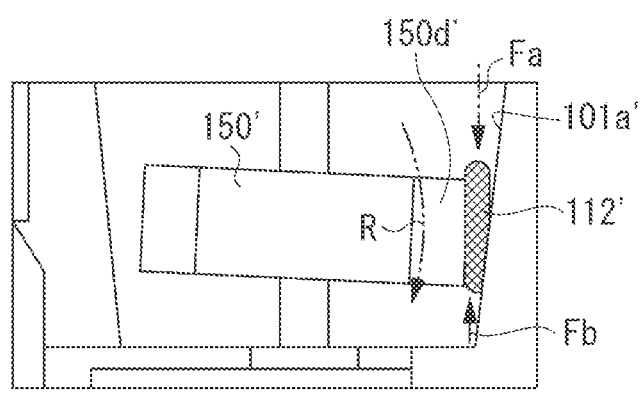

FIG. 20A illustrates the neighborhood portion of the slit in the spectral colorimetric apparatus viewed from above. FIG. 20B illustrates the neighborhood portion of the slit in the spectral colorimetric apparatus viewed from above.

Figure 7A:
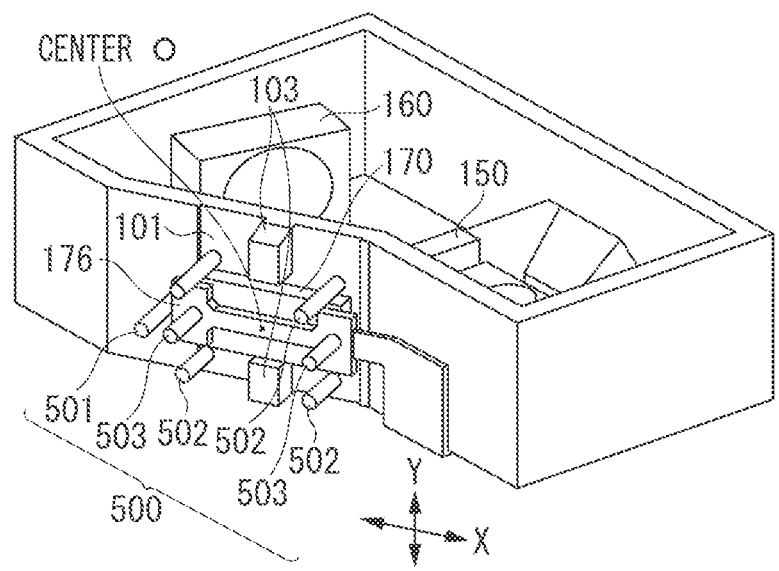
FIG. 7A illustrates a color sensor unit, which is viewed from obliquely above, at adjustment of the linear sensor. FIG.
Figure 21:
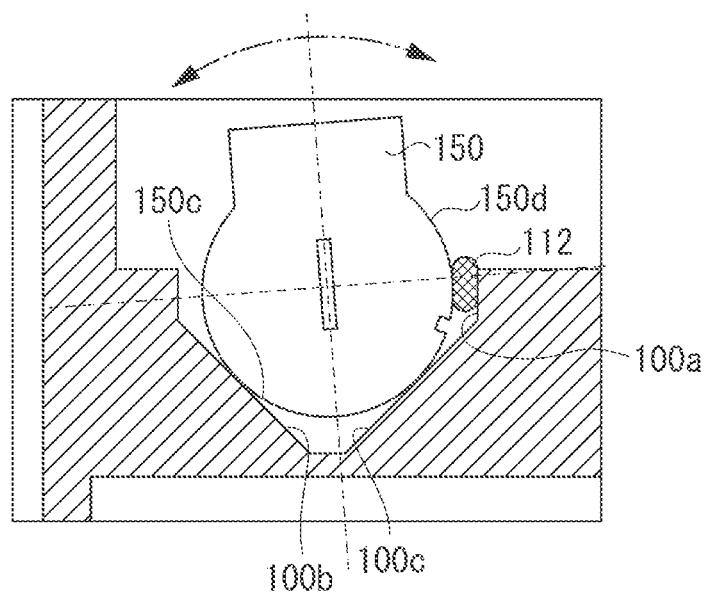

FIG. 21 is a cross-sectional diagram, taken from a direction indicated by the arrow B illustrated in FIG. 7A, illustrating the neighborhood portion of the slit in the spectral colorimetric apparatus.

Figure 22:
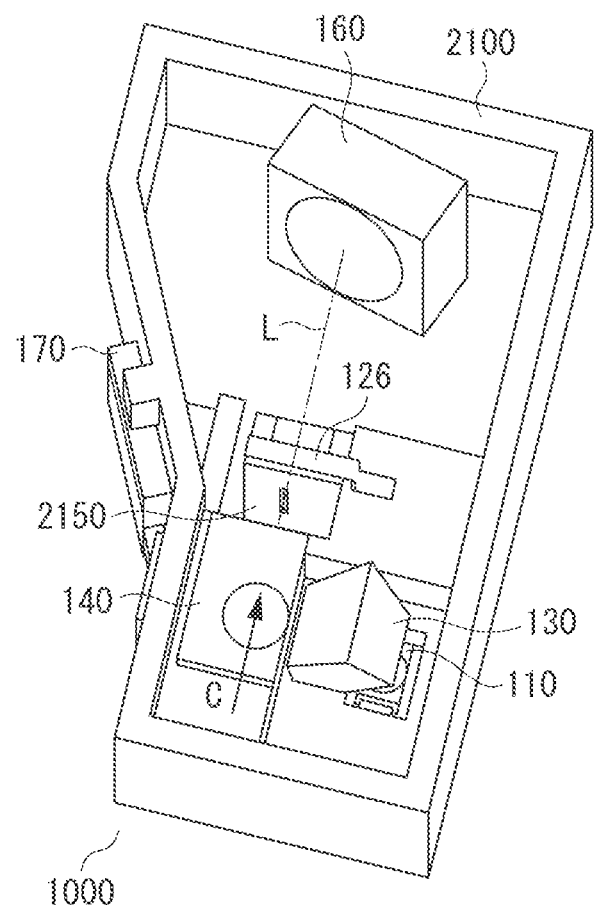

FIG. 22 illustrates a spectral colorimetric apparatus in a state in which a cover is removed therefrom.

Figure 23A:
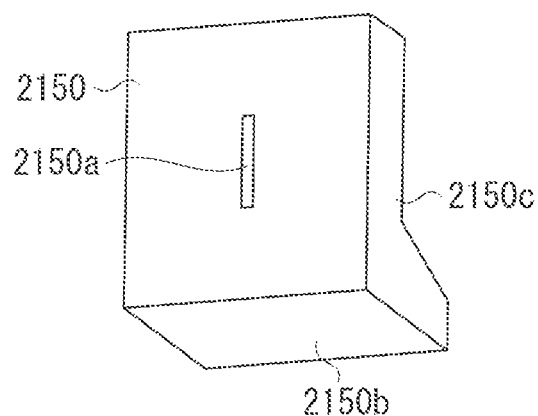
Figure 23B:
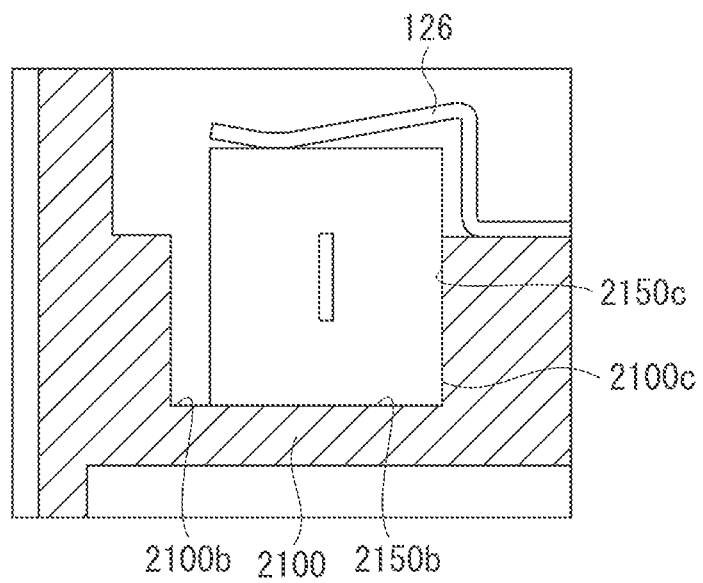

FIG. 23A is a schematic diagram illustrating a slit. FIG. 23B is a cross-sectional diagram, taken from a direction of an arrow C illustrated in FIG. 10, illustrating the neighborhood portion of the slit in the spectral colorimetric apparatus.

Figure 24A:
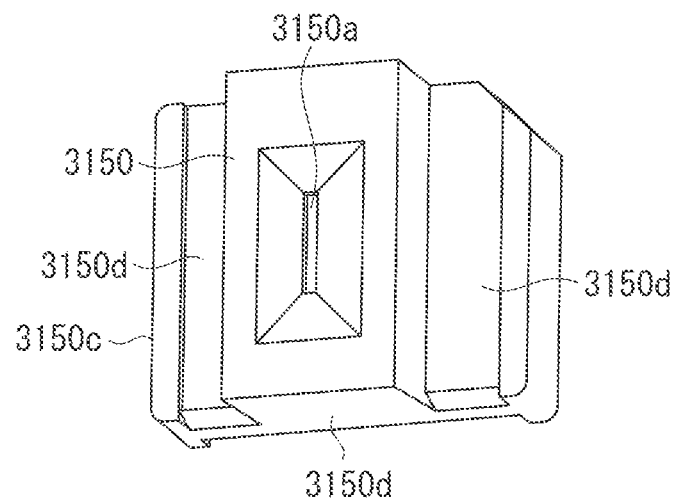
Figure 24B:
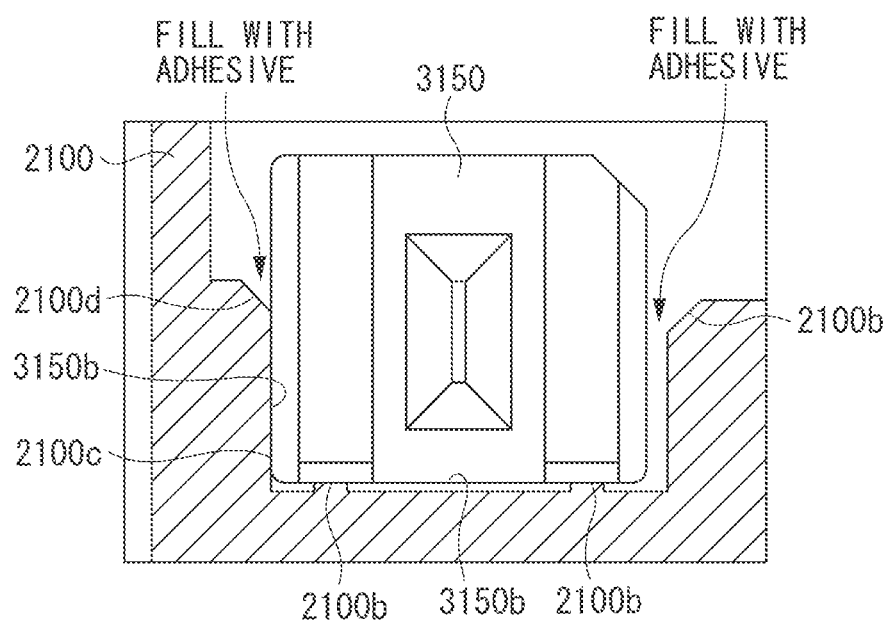

FIG. 24A is a schematic diagram illustrating a slit. FIG. 24B is a diagram corresponding to a cross-sectional diagram, taken from a direction of an arrow C illustrated in FIG. 22, illustrating the neighborhood portion of the slit in the spectral colorimetric apparatus.

DESCRIPTION OF THE EMBODIMENTS

Various embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

Dimensions, materials, shapes, relative arrangements, optical characteristics and the like of components described in the following embodiments may appropriately be changed according to apparatuses and various conditions, to which the present invention is applied, and are not intended to limit the scope of the present invention.

Hereinafter, a first embodiment of the present invention is described. First, a color image forming apparatus is described, in which a spectral colorimetric apparatus according to the first embodiment of the present invention is mounted. Then, color calibration using the spectral colorimetric apparatus is described.

(Color Image Forming Apparatus)

Figure 1:
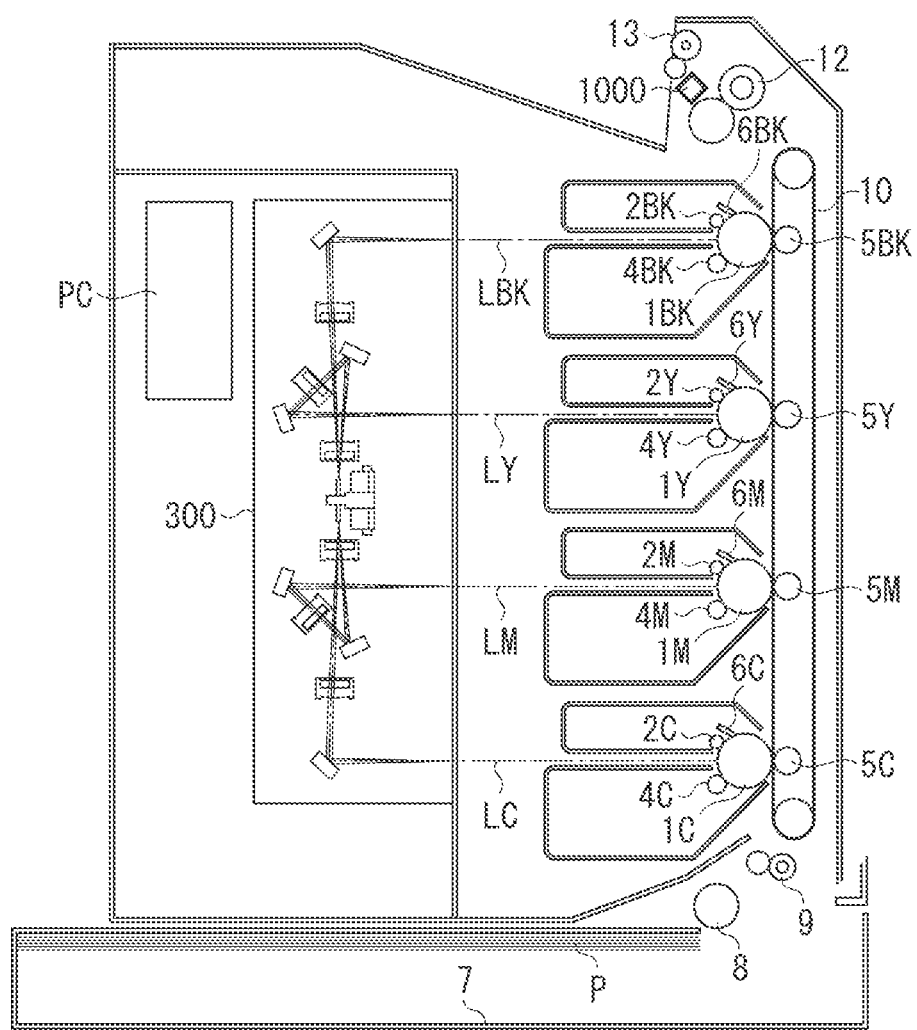
FIG. 1 is a schematic diagram illustrating a color image forming apparatus.

First, image formation by a color image forming apparatus in which a spectral colorimetric apparatus according to the present embodiment is mounted is described. FIG. 1 is a schematic diagram illustrating the color image forming apparatus in which the spectral colorimetric apparatus serving as a detection device for detecting a color image according to the present embodiment is mounted. A spectral colorimetric apparatus 1000 has a configuration that is described below. Each photosensitive drum 1 serving as an image carrier rotates counterclockwise, as viewed in FIG. 1 (incidentally, photosensitive drums 1C, 1M, 1Y, and 1BK correspond to cyan, magenta, yellow, and black, respectively).

First, a surface of each of the photosensitive drums 1C, 1M, 1Y, and 1BK is uniformly charged by an associated one of charging devices 2 (2C, 2M, 2Y, and 2BK), respectively. Then, each of light beams (laser beams) L (LC, LM, LY, and LBK) optically-modulated according to image information is output from a scanning optical device 300 and irradiated onto the surface of an associated one of the photosensitive drums 1C, 1M, 1Y, and 1BK so as to form an electrostatic latent image thereon. The electrostatic latent images are respectively visualized as cyan, magenta, yellow, and black toner images by developing devices 4 (4C, 4M, 4Y, and 4BK).

Meanwhile sheet materials P, stacked on a paper feed tray 7, are fed out one-by-one by a paper feed roller 8. The sheet materials P are sent onto a transfer belt 10 by a registration roller 9 in synchronization with image write timing. Then, the above toner images are superimposed by being sequentially transferred by transfer rollers 5 (5C, 5M, 5Y, and 5BK) onto the sheet material P conveyed on the transfer belt 10. Thus, a color image is formed thereon. Finally, the sheet material P is pressurized and heated by a fixing device 12. Accordingly, a color image fixed onto the sheet material P is obtained. Then, the sheet material P is conveyed by a paper discharging roller 13 so as to be discharged to outside of the apparatus.

After the transfer, residual toner left on the surfaces of the photosensitive drums 1 (1C, 1M, 1Y and 1BK) are respectively removed by cleaners 6 (6C, 6M, 6Y, and 6BK). Then, the surfaces of the photosensitive drums 1 (1C, 1M, 1Y and 1BK) are uniformly charged again by the charging devices 2 (2C, 2M, 2Y, and 2BK) to form the next color image. Here, the photosensitive drums 1, the charging devices 2, the scanning optical device 300, the developing devices 4, the transfer rollers 5, and the fixing device 12 are referred to as an image formation device for forming an image on a sheet material.

(Color Calibration Using Spectral Colorimetric Apparatus)

Next, color calibration using the spectral colorimetric apparatus is described below. The spectral colorimetric apparatus (hereinafter referred to as a color sensor unit) 1000 is installed on a paper conveying path just posterior to the fixing device 12, and arranged such that a surface of paper is irradiated with illumination light with an incident angle of about 45 degrees. The color sensor unit 1000 detects tint of each color patch from the surface of paper, on which an image of a single-color or mixed-color patch is formed and fixed. Then, image formation conditions for the image formation device are controlled based on an output of the color sensor unit. Thus, color calibration is performed. A purpose of colorimetry of the color patch formed on the paper after the fixation of the image is that color calibration is performed in consideration of tint change caused due to a paper type, or by the fixation or the like.

A result of detection, which is read by the color sensor, is transferred to a printer controller personal computer (PC). Then, the printer controller PC determines whether color reproducibility of an output tint of the color patch is appropriate. If a color difference between the tint of the output color patch and a tint indicated according to the image data by the printer controller PC is within a predetermined range, the color calibration is ended. If the color difference is outside the predetermined range, the printer controller PC performs color calibration based on color difference information until the color difference falls within the predetermined range.

Thus, tint of a color image formed on paper is detected by mounting the color sensor unit in the color image forming apparatus. Consequently, the tint of the color image formed on the paper can be corrected. More specifically, according to the color sensor unit, if a difference is caused between the tint indicated by the printer controller PC according to image data and the tint of the color image formed on the paper due to the difference between image forming apparatuses, the paper type, the usage environment, usage frequency, and the like, stable tint can be reproduced. Accordingly, higher-level color calibration can be implemented.

(Spectral Colorimetric Apparatus (Color Sensor Unit))

Figure 2A:
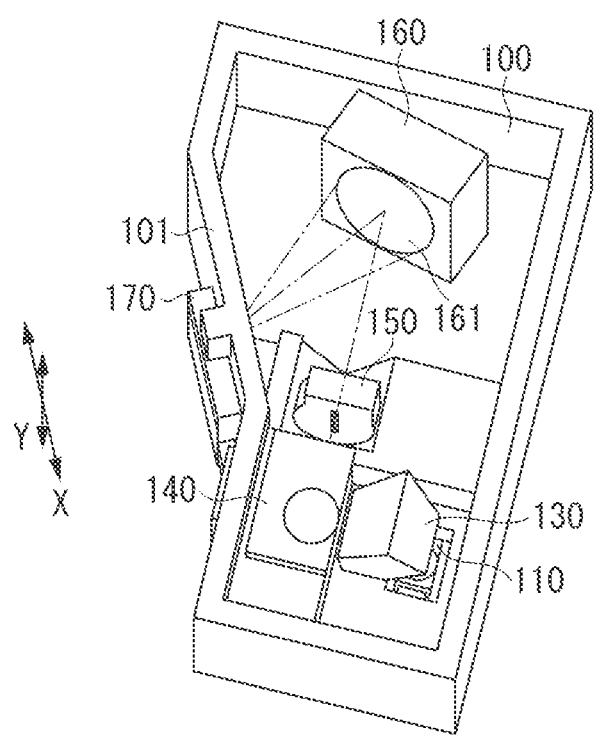
FIG. 2A is a schematic diagram illustrating an internal configuration of a color sensor unit.
Figure 2B:
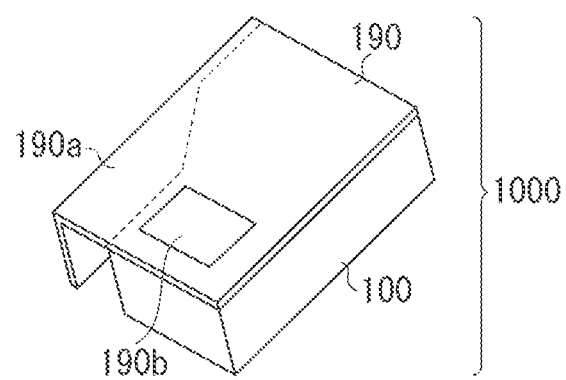
FIG. 2B is a schematic diagram illustrating an external appearance configuration of the color sensor unit to which a cover is attached.
Figure 3A:
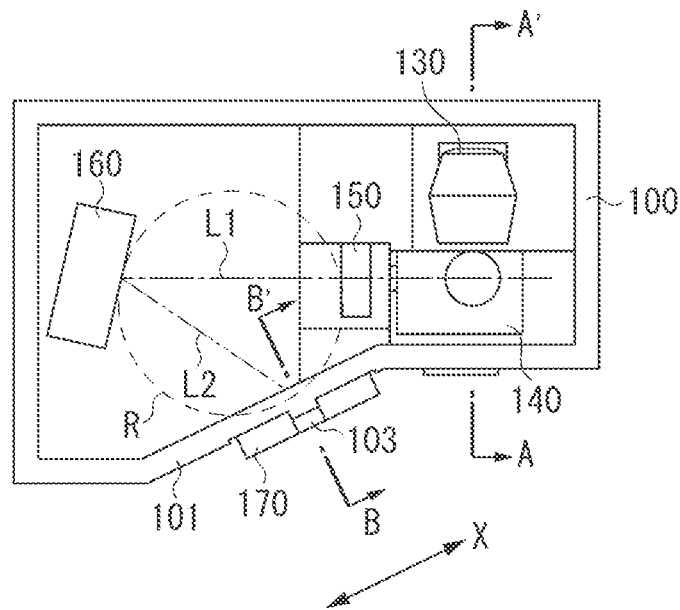
FIG. 3A illustrates the color sensor unit viewed from the top.
Figure 3B:
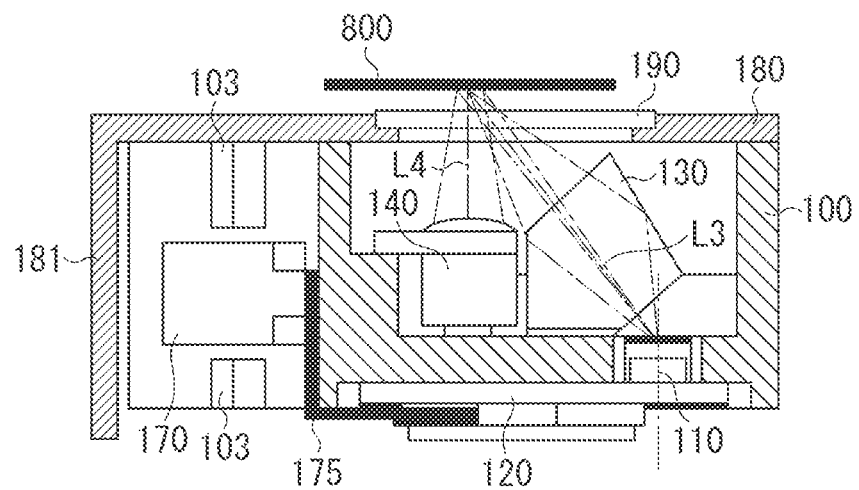
FIG. 3B is a cross-sectional diagram, taken on a line A-A' illustrated in FIG. 3A, illustrating the color sensor unit.

Next, the spectral colorimetric apparatus is described below with reference to FIGS. 2A through 3B. FIG. 2A is a schematic diagram illustrating an internal configuration of the color sensor unit. FIG. 2B is a schematic diagram illustrating an external appearance configuration of the color sensor unit to which a cover is attached. FIG. 3A is a top view of the color sensor unit from which the cover is removed. FIG. 3B is a cross-sectional diagram, taken on a line A-A' illustrated in FIG. 3A, illustrating the color sensor unit. However, FIG. 3B illustrates the color sensor unit to which the cover is attached.

An orientation of the color sensor unit 1000 being in a state in which the color sensor unit 1000 detects the tint by irradiating light on a horizontal detection surface 800 (see FIG. 3B) from below is determined as a reference orientation for determining an up-down direction of the color sensor unit 1000. In other words, an upper side of FIG. 3B is regarded as an upper side of the color sensor unit 1000. The reference orientation is set for convenience of description. The orientation in which the color sensor unit 1000 performs detection is not limited to the reference orientation.

Hereinafter, each component making up the color sensor unit 1000 is described. A light-emitting diode (LED) 110 is a white LED serving as a light source. The LED 110 is mounted on a sensor unit control circuit board 120, which is described below. The LED 110 is a top view type LED that emits light perpendicularly to a mounting surface. Because the LED 110 emits light in the colorimetric range from 350 nanometers (nm) to 750 nm, the LED 110 is known as a white LED.

The sensor unit control circuit board 120 is used to control light emission of the LED 110 and signal processing for converting into an electric signal an output detected by a linear sensor 170, which is described below. An illumination light member 130 is a light guide optical member for irradiating a light beam L emitted from the LED 110 onto the detection surface 800 (see FIG. 3B). More specifically, the illumination light member 130 is a light guide formed of an acrylic resin.

The light beam L emitted from the LED 110 has a light distribution angle characteristic set such that an amount of light is maximized in a direction of a surface normal-line of a light-emitting surface, and that the amount of light decreases with distance (or inclined) from the direction of the surface normal-line. Thus, the illumination optical member 130 has a shape that can efficiently guide the light onto the detection surface.

The light guide optical member 140 is an optical member for guiding the light reflected from the detection surface to a slit 150, which is described below. The light guide optical member 140 is a light guide formed of an acrylic resin and has a function of deflecting the light beam from the detection surface 800 substantially in parallel to the detection surface 800 and of condensing the light beams in a direction parallel to a dispersing direction X. The dispersing direction X is defined as a direction in which a light beam is separated by a concave surface reflection type diffraction grating (a concave surface reflection type diffraction element) 160 into components by wavelength. The slit 150 is arranged such that a light beam guided by the light guide optical member 140 forms a desired shape on the linear sensor 170 which is described below.

The concave surface reflection type diffraction grating 160 is an optical member configured to reflect and disperse the light beam output from the slit 150 by a spectral reflection surface 161. The concave surface reflection type diffraction grating 160 is a resin member manufactured by injection molding. The spectral reflection surface 161 has a shape in which fine blaze gratings are formed at equal interval pitches on a base surface. A Rowland circle R is defined in a Rowland type dispersing optical system using such a concave surface reflection type diffraction grating.

A direction perpendicular to both of the dispersing direction X and a direction of an optical axis of a dispersed light beam is defined as a Y-direction. Thus, the Rowland circle R is an imaginary circle which has a diameter equal in length to a curvature radius of the spectral reflection surface 161 and touches a central point of a dispersing reflection surface 161. Light dispersed by the concave surface reflection type diffraction grating 160 is condensed onto the Rowland circle R. If the base surface of the spectral reflection surface 161 has a spherical shape, optical performance is reduced because an image formation state in the dispersing direction X differs from that in the direction Y. Thus, the base surface is shaped into a curved surface whose curvature in the dispersing direction X differs from that in the direction Y. Consequently, sufficient image formation performance can be obtained.

The linear sensor 170 is an optical member that includes a light receiving element 174 serving as an array type light receiving member in which a plurality of photoelectric conversion elements (or pixels), such as silicon (Si) photodiodes, are arranged like an array in the dispersing direction X. The linear sensor 170 receives, at the light receiving element 174, a dispersed light beam dispersed by the concave surface reflection type diffraction grating 160 and outputs a signal corresponding to an amount of light received by each photoelectric conversion element. The linear sensor 170 is held in a housing 100 by an adhesive filled in a space between the linear sensor 170 and a convex portion 103 provided in the housing 100, which is described below in detail.

The light receiving element 174 is connected to a flexible circuit board 175 that is electrically connected to the sensor unit control circuit board 120. An output of the light receiving element 174 is output to the sensor unit control circuit board 120 via the flexible circuit board 175.

The above-described group of optical members and circuit boards are housed or held in the housing 100 that is a box-shaped casing configured by a bottom surface and a side wall 101 surrounding the bottom surface. The linear sensor 170 is supported on an outer side of the housing 100 by the side wall 101. The sensor unit control circuit board 120 is fastened to the bottom surface of the housing 100 from below with screws 200 (see FIG. 5A) and held by the housing 100. Thus, a relatively wide space can be secured around the linear sensor 170, as compared with a case where the sensor unit control circuit board 120 is held by the linear sensor 170 itself.

According to this configuration, even when contact energization of the device is performed with a probe tool or the like to control a light emission operation of the LED 110 and an electrical processing operation of the linear sensor 170, external stress is not applied directly to the linear sensor 170. Thus, various characteristics are not deteriorated.

Positioning of each of the illumination optical member 130, the light guide optical member 140, and the concave surface reflection type diffraction grating 160 is performed by a positioning unit provided in the housing 100. Thus, each of the illumination optical member 130, the light guide optical member 140, and the concave surface reflection type diffraction grating 160 is bonded and fixed to the position with an adhesive. Positions of the slit 150 and the linear sensor 170 are adjusted so as to be located substantially on a circumference of the Rowland circle R. Thus, the slit 150 and the linear sensor 170 are bonded and fixed to the housing 100.

A housing cover 190 for covering an inside of the housing 100 is attached to the housing 100 to form the color sensor unit 1000 integrally therewith. An opening window through which illumination light to be irradiated through the illumination optical member 130 onto the detection surface 800 and reflection light reflected on the detection surface 800 and guided to the light guide optical member 140 are passed is provided in a part of the housing cover 190. A cover glass 190b is attached to the opening window to prevent dust and paper powder from entering the housing 100.

A linear sensor cover portion 190b extended to cover not only a portion covering the inner side of the housing 100 but a back side (i.e., aside that doesn't abut on the side wall 101) of the linear sensor 170 is formed on the housing cover 190. With such a configuration, when the unit is conveyed after assembly thereof, or when the unit is assembled into the image forming apparatus, the linear sensor 170 can be protected and prevented from being touched. A dashed line illustrated in FIG. 2B indicates a part of a contour of the side wall 101 of the housing 100, which is hidden by the housing cover 190.

(Colorimetric Method)

Next, a colorimetric method for performing colorimetry on a color patch using the color sensor unit 1000 integrally formed in the above manner is described below. As illustrated in FIG. 3B, a light beam (having an optical axis L3) emitted from the LED 110 is transmitted by the illumination optical member 130 and the cover glass 190b. The transmitted light beam illuminates the color patch 800 serving as the detection surface formed on paper. A light beam (having an optical axis L4) reflected by the color patch 800 is transmitted by the cover glass 190b and the light guide optical member 140, and led to the slit 150. Then, a substantially linear image is formed from the transmitted light beam on the slit 150.

A light beam (having an optical axis L1), whose shape is regulated to a predetermined one, is incident on the concave surface reflection type diffraction grating 160. An slit image corresponding to each wavelength is formed on the linear sensor 170 from a light beam (having an optical axis L2) dispersed as primary diffracted light, among light beams reflected and diffracted by the concave surface reflection type diffraction grating 160. FIG. 3A illustrates an optical axis of a light beam having a wavelength 550 nm as a representative one of the optical axis L2.

The linear sensor 170 receives light having each wavelength at the light receiving element 174 and outputs a signal corresponding to the received light. The output of the linear sensor 170 is corrected on the sensor unit control circuit board 120 based on spectral characteristics of the white LED 110 and spectral sensitivity of the light receiving element. Then, a tint of a light beam (having an optical axis L4) reflected by the color patch 800 is calculated. The calculated value of the tint is transmitted to the printer controller PC. Thus, colorimetry is performed on the color patch 800. The present invention is featured in configuration of holding the linear sensor 170. Hereinafter, a configuration of the linear sensor 170 itself, a configuration of the wide wall 101 holding the linear sensor 170, and a method for attaching and adjusting the linear sensor 170 are described.

(Configuration of Linear Sensor)

Figure 4A:
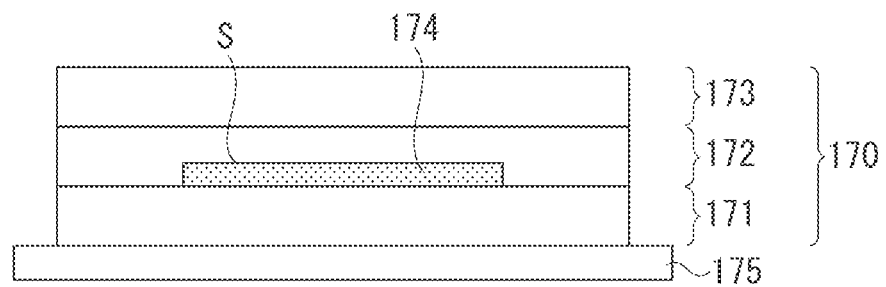
FIG. 4A is a cross-sectional diagram illustrating a linear sensor, which is viewed from a longitudinal direction of the linear sensor.

First, the configuration of the linear sensor 170 is described in detail below. FIG. 4A is a cross-sectional diagram taken from a lateral direction of the linear sensor 170. The linear sensor 170 is configured as a layer structure including a substrate portion 171 on which the light receiving element 174 is mounted, a sealing portion 172 for sealing the light receiving element 174 with an adhesive, and a glass portion 173 for covering these portions. The light receiving element 174 is configured such that a plurality of photoelectric conversion elements (or pixels) is arranged in a single direction. A surface of the light receiving element 174 is set as a light receiving surface S. A deformable flexible circuit board 175 is bonded to and electrically connected by solder to the substrate portion 171.

Figure 5A:
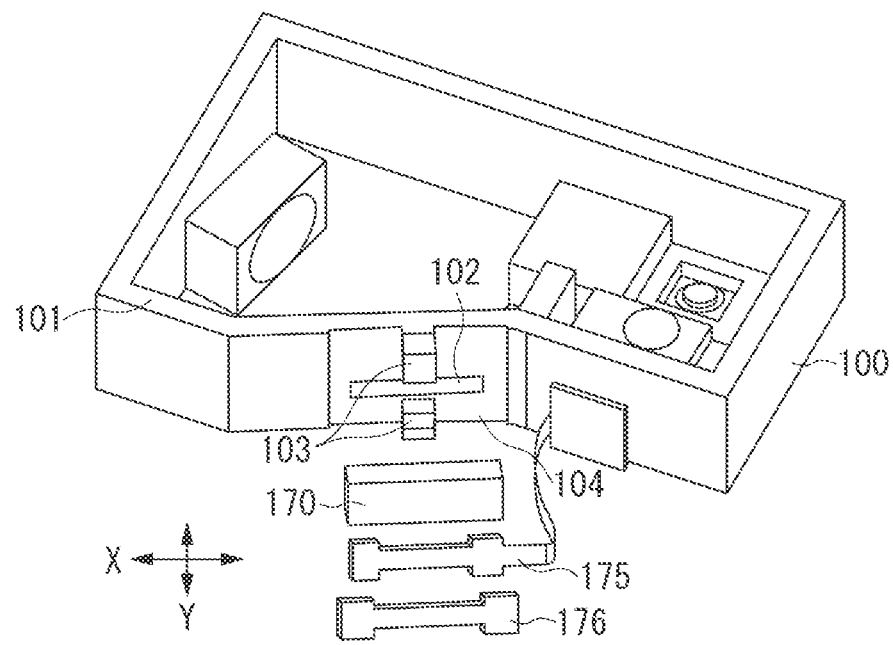
FIG. 5A illustrates a linear sensor, which is viewed from obliquely and backwardly above, to be attached to a housing, in a state in which the linear sensor is virtually exploded.
Figure 5B:
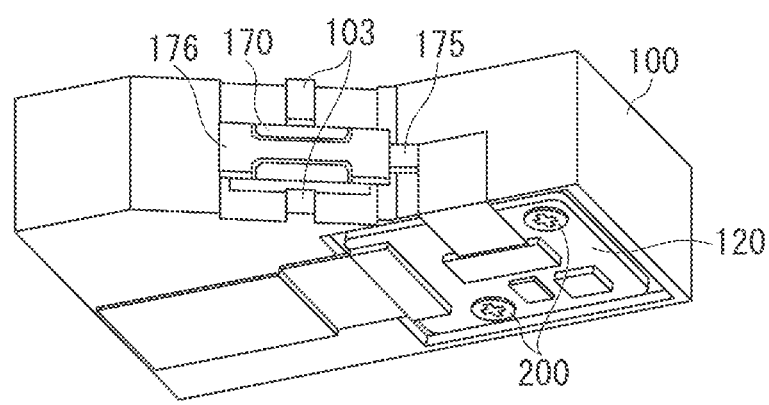
FIG. 5B illustrates the linear sensor attached to the housing, which is viewed from obliquely and backwardly below.

FIG. 5A illustrates the linear sensor 170 and the like attached to the housing 100, which is viewed from backwardly and obliquely above, in a state in which the linear sensor 170 and the like are virtually exploded. However, drawing of the illumination optical member 130 is omitted. FIG. 5B illustrates the linear sensor 170 attached to the housing 100, which is viewed from backwardly and obliquely below.

An end portion of the flexible circuit board 175, which is not at a side thereof connected to the substrate portion 171 of the linear sensor 170, is connected to the sensor unit control circuit board 120 in a state in which the linear sensor 170 is attached thereto. A reinforcing member made of a glass epoxy material for reinforcing a connection portion between the substrate portion 171 of the linear sensor 170 and the flexible circuit board 175 is bonded to a back side of the connection portion. The reinforcing member 176 also serves as a member for strongly supporting the linear sensor 170 with a tool, which is described below.

The flexible circuit board 175 and the reinforcing member 176 are bonded only to and cover a part of the back side of the substrate portion 171 of the linear sensor 170 on which electrical connection is formed. The flexible circuit board 175 and the reinforcing member 176 are shaped to expose the rest part of the back side of the substrate portion 171 of the linear sensor 170. Accordingly, heat radiation performance of the linear sensor 170 is high.

A support potion (not illustrated) to be pinched with a tool at adjustment of the linear sensor 170 to facilitate the reinforcing member 176 to support the linear sensor is formed on the reinforcing member 176. The reinforcing member 176 has rigidity sufficient to the extent that the reinforcing member 176 does not deform the linear sensor 170 while strongly supporting the linear sensor 170 with a tool. A shape of the reinforcing member 176 can optionally be optimized according to the tool and a process design. Accordingly, design flexibility can be enhanced.

(Housing for Supporting Linear Sensor)

Next, the configuration of the side wall 101 of the housing 100, which supports the linear sensor 170, is described below with reference to FIG. 3A. The dispersing optical system using the concave surface reflection type diffraction grating has a property that a light source and an image arranged on the Rowland circle are conjugated with each other. In other words, favorable optical performance can be obtained by placing the linear sensor on the Rowland circle. Thus, in order to place the linear sensor 170 on the Rowland circle R of the concave surface reflection type diffraction grating 160, the apart of the side wall 101, on which the linear sensor 170 is placed, is provided to be substantially parallel to a tangential line of the Rowland circle R.

FIG. 3A illustrates a light beam of a wavelength of 550 nm having optical axes L1 and L2 as a representative one of light beams incident upon the linear sensor 170. A light beam passing through the slit 150 and being incident upon the concave surface reflection type diffraction grating 160 has the optical axis L1. A light beam reflected by the concave surface reflection type diffraction grating 160 and being incident upon the linear sensor 170 has the optical axis L2. The smaller the angle formed between the optical axes L1 and L2, the more favorable the optical performance can be obtained. This is the same with a light beam of another wavelength. Accordingly, the part of the side wall 101, on which the linear sensor 170 is arranged, is provided at a location at which the angle formed between the optical axes L1 and L2 is as small as possible while a space for enabling adjustment of the position of the linear sensor 170 is secured.

Figure 4B:
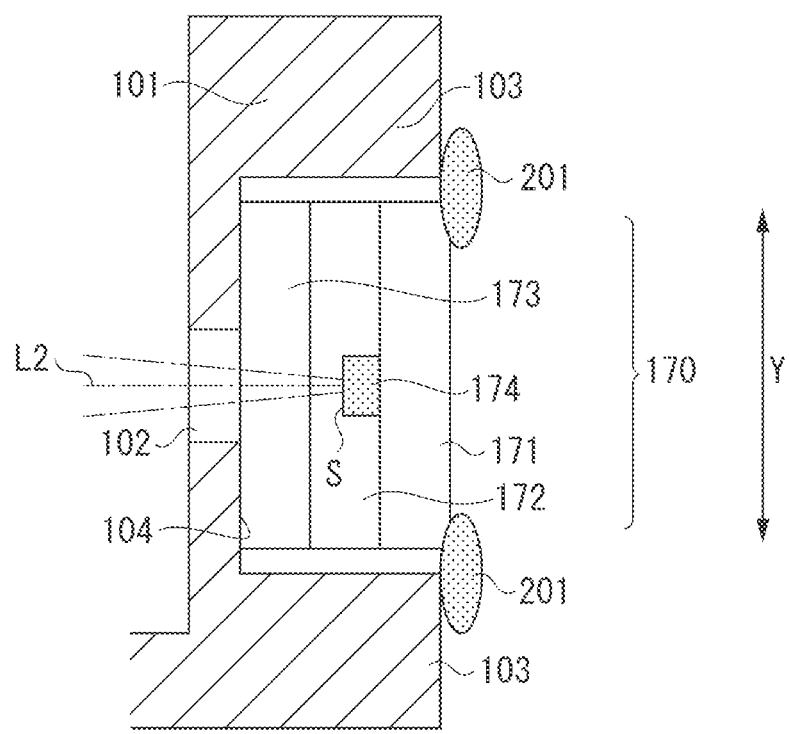
FIG. 4B is a cross-sectional diagram, taken on a line B-B' illustrated in FIG. 3A, illustrating apart of the side wall when holding the linear sensor.

Next, the part of the side wall 101, which holds the linear sensor 170, is described in more detail with reference to FIGS. 5A, 5B, and 4B. FIG. 4B is a cross-sectional diagram, taken on the line B-B' illustrated in FIG. 3A, illustrating the part of the side wall 101 that holds the linear sensor 170. FIG. 4B also illustrates a cross-section of the linear sensor 170, which is viewed from a longitudinal direction thereof.

An opening portion 102 is provided in the side wall 101. A light beam dispersed by the concave surface reflection type diffraction grating 160 passes through the opening portion 102 and reaches the light receiving element 174 of the linear sensor 170. The opening portion 102 is shaped to have a size that among diffracted light beams which are diffracted by the concave surface reflection type diffraction grating 160 and have wavelengths of 350 nm through 750 nm necessary for colorimetry, a primary diffracted light beam (dispersed light beam) can pass therethrough. An adjustment surface 104, on which the linear sensor 170 abuts from an outer side of the housing 100, is provided around the opening portion 102 of the side wall 101. The linear sensor 170 is fixed to the side wall 101 in a state in which a surface of the glass portion 173 abuts on the adjustment surface 104, and the light receiving surface S faces to the opening portion 102.

The adjustment of the position of the linear sensor 170, which is described below, is performed by moving the lines sensor 107 in the X-direction and the Y-direction while the linear sensor 170 abuts on the adjustment surface 104. In other words, the adjustment surface 104 functions as a surface (abutment surface) to adjust the linear sensor 107 by abutting thereon. The opening portion 102 is blocked with the linear sensor 170 in a state in which the linear sensor 170 is attached to the side wall 101. A gap through which external air enters the housing 100 is blocked by fixing the adjustment surface 104 and the glass portion 173 of the linear sensor 170 placed around the opening portion 102 while causing the adjustment surface 104 and the glass portion 173 to abut on the opening portion 102. Thus, occurrence of stain due to entry of dust such as paper powder to the housing 100 can be prevented.

Although it is described that the opening portion 102 is a hole-shaped part provided on the side wall 101, the opening portion 102 can be formed by forming a notch in the side wall 101 which is shaped like a hole when the housing cover 190 is attached to the housing 100. In this case, the notch of the side wall 101 functions as the opening portion 102.

Next, the adjustment surface 104 is described in detail hereinafter. The adjustment surface 104 is provided substantially in parallel to the dispersing direction X and the direction Y perpendicular to the direction of the optical axis L2 of a dispersed light beam. Further, the adjustment surface 104 is provided substantially in parallel to a tangential line at a part in a range of primary diffracted light beams (dispersed light beams) of wavelengths ranging from 350 nm to 750 nm received by the linear sensor 170 provided on the Rowland circle R. The "part in a range of primary diffracted light beams (dispersed light beams) of wavelengths from 350 nm to 750 nm received by the linear sensor 170 provided on the Rowland circle R" is a part at which the primary diffracted light beams of wavelengths ranging from 350 nm to 750 nm intersect with the Rowland circle R, as viewed from the direction Y illustrated in FIG. 3A. Hereinafter, the part at which the primary diffracted light beams of wavelengths ranging from 350 nm to 750 nm intersect with the Rowland circle R is referred to as a circular arc Ra.

A position in the direction of a radius of the Rowland circle R of the adjustment surface 104 is a position, at which at least one point of the light receiving surface S is located on the circular arc Ra, in a state in which the linear sensor 170 abuts on the adjustment surface 104. It is set in view of a refractive index of each of the glass portion 173 and the sealing portion 172 that at least one point of the light receiving surface S is located on the circular arc Ra. It is desirable that a position in the direction of the radius of the Rowland circle R of the adjustment surface 104 is the above-described position. However, it is not always necessary to be exactly at the above-described position, but can be a position in vicinity thereof. This is because if a position of the slit 150, which is described below, is adjusted to thereby adjust a spot shape of an image formed by the light beam on the light receiving surface S, the linear sensor 170 can be adjusted to detect the dispersed light beam with sufficient accuracy.

Figure 6:
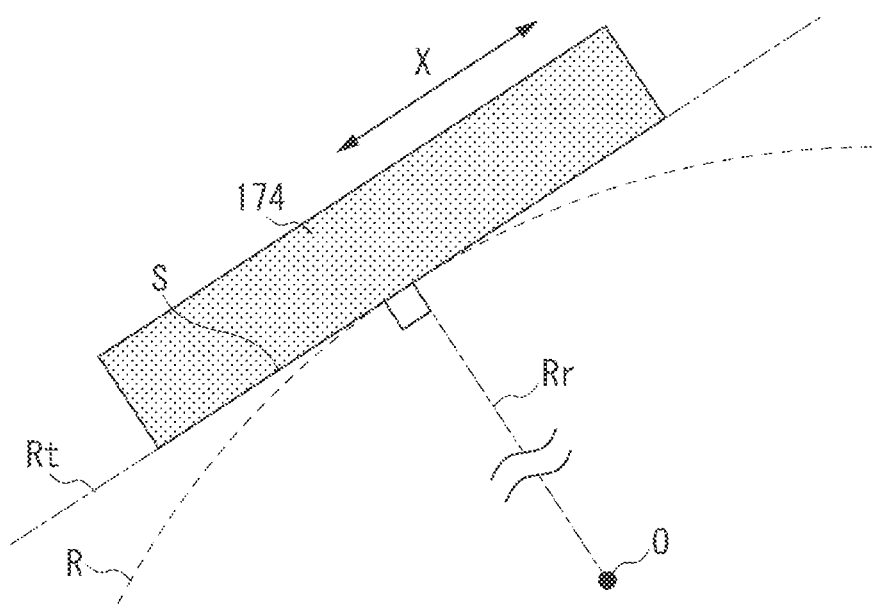
FIG. 6 schematically illustrates a movement in an X-direction of a light receiving element of the linear sensor.

FIG. 6 schematically illustrates a movement in the X-direction of the light receiving element 174 of the linear sensor 170, which is taken from the Y-direction. The adjustment surface 174 (not illustrated) is provided substantially in parallel to a tangential line Rt at a part at which the Rowland circle R intersects with dispersed light beams received by the linear sensor 170. Thus, if the linear sensor 170 is moved in the X-direction while the linear sensor 170 abuts against the adjustment surface 104, the light receiving surface S moves along the tangential line Rt. More specifically, a distance between the light receiving surface S and the center O of the Rowland circle R in a direction of a normal line to the light receiving surface S (a direction of a radius Rr at a contact point between the tangential line Rt and the Rowland circle R) is constant.

A means is devised to bond and fix the linear sensor to the side wall 101 with high accuracy. More specifically, the convex portions 103 configured to be convex to a side (an outer side of the housing), on which the linear sensor 170 abuts, are formed on the side wall 101. The convex portion 103 is provided at a position at which the convex portion 103 faces one of both ends in the Y-direction of the linear sensor 170 abutting on the adjustment surface 104, and at which the convex portion 103 faces the vicinity of the center in the X-direction of the light receiving element 174 of the linear sensor 170 abutting on the adjustment surface 104. A space between the convex portion 103 and the linear sensor 170 is filled with an ultraviolet curing adhesive 201. After the adjustment of the position of the linear sensor 170, the ultraviolet curing adhesive is cured by applying ultraviolet thereon. Thus, the linear sensor 170 is fixed to the side wall 101. In other words, the convex portion 103 functions as a bonding portion for fixing the linear sensor 170 to the side wall 101 with the adhesive filled with the space between the convex portion 103 and the linear sensor 170.

(Outline of Method of Adjusting Linear Sensor)

Figure 7B:
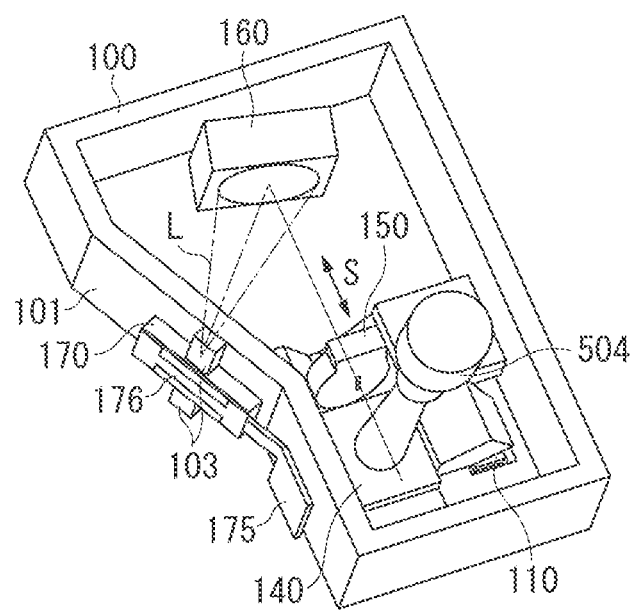

An outline of a method for adjusting the linear sensor 170 is specifically described below with reference to FIGS. 7A and 7B. FIGS. 7A and 7B illustrate the outline of the method for adjusting the linear sensor 170. FIG. 7A illustrates the color sensor unit at adjustment of the linear sensor, which is viewed from obliquely above. FIG. 7B also illustrates the color sensor unit at adjustment of the linear sensor, which is viewed from obliquely above. The position of the linear sensor 170 is adjusted by adjusting the positions thereof in each of directions of two axes parallel to a plane perpendicular to a normal line to the light receiving surface S of the light receiving element 174 and the orientation around the normal line to the light receiving surface S. One of the two axes is an axis (i.e., the X-axis) along a direction of arranging the light receiving element 174, i.e., the dispersing direction X in which a light beam incident upon the concave surface reflection type diffraction grating is dispersed and separated into wavelength components. The other axis is an axis in the Y-direction (i.e., the Y-axis) perpendicular to an optical axis of a light beam incident upon the linear sensor 170 and to the dispersing direction. After the position is determined, each pixel of the linear sensor 170 is associated with the dispersed light beam.

(Linear Sensor Adjustment Tools)

Tools for adjusting the linear sensor 170 are described with reference to FIG. 7A. Such tools include an abutment tool 501 for supporting an end of the X-axis of the reinforcing member used integrally with the linear sensor 170, a clamping tool 502 for supporting the linear sensor 170 in the Y-axis direction from its top and bottom, an urging tool 503 for urging and supporting the linear sensor in the direction of an optical axis thereof, and a monochromator 504 capable of outputting single wavelength light. The abutment tool 501, the clamping tool 502, and the urging tool 503 are formed integrally as a linear sensor adjustment tool 500. The linear sensor adjustment tool 500 can be moved by a moving device (not shown), in a state in which the linear sensor 170 is grasped, in two axis directions, i.e., in an arrangement direction (X-axis direction) of the linear sensor 170, and a direction (Y-axis direction) perpendicular to the arrangement direction. In addition, the linear sensor adjustment tool 500 can rotate the linear sensor 170 around the normal line to the light receiving surface S. Drawing of these tools in FIG. 7B is omitted.

The reinforcing member 176 formed integrally with the linear sensor 170 abuts on the abutment tool 501 at an end thereof at a side that is not connected to the sensor unit control circuit board 120 (i.e., a side from which the flexible circuit board 174 extends). Thus, the position in the X-axis direction of the linear sensor 170 is determined. The linear sensor 170 is supported at four points by the clamping tools 502. Consequently, the position in the Y-axis direction of the linear sensor 170 is determined.

In a state in which the linear sensor 170 is held by the clamping tools 502, it is preferable for maintaining a stable holding state that the following conditions are satisfied. When viewed from a direction perpendicular to the X-axis and the Y-axis, among the light receiving elements 174 arranged in an array in an imaginary rectangle formed by connecting four points at which the linear sensor 170 touches the clamping tools 502, a light receiving element in the center of the direction in which the light receiving elements are arranged is placed at the center O. More preferably, a substantial center of the above imaginary rectangle (i.e., a point of intersection of diagonal lines of the rectangle), or a position of the center of gravity of the rectangle substantially coincides with that of the center O. According to the present embodiment, the substantial center of the above imaginary rectangle coincides with the center O.

The adjustment of the position of the linear sensor 170 is performed while the position of the slit 150 is adjusted by holding the linear sensor 170 with the clamping tools 502 and causing the linear sensor 170 to abut on the adjustment surface 104. The housing 100 to which optical components other than the linear sensor 170 are bonded and fixed is attached to a reference position for the adjustment tool. The urging tool 503 causes the glass portion 173 of the linear sensor 170 to abut against the adjustment surface 104 (see FIGS. 4B and 5A) on the side wall 101 of the housing 100 so as to be urged in the direction of the normal line to the light receiving surface.

Then, in a state in which the linear sensor 170 abuts against the adjustment surface 104 by being held with the clamping tools 502, the position in each of the X-axis direction and the Y-axis direction of the linear sensor 170 and the orientation around the normal line to the light receiving surface S thereof are tentatively determined. In this state, light having wavelengths from 350 nm to 750 nm is incident on the light receiving element 174. The position in the X-axis direction and the Y-axis direction of the linear sensor 170 at this state is a tentative position determined temporarily to adjust the slit. A final position in the X-axis direction and the Y-axis direction of the linear sensor 170 is determined after the position of the slit 150 is adjusted and finally determined in this state.

According to the present embodiment, the tentative positioning of the linear sensor 170 is completed by placing the clamping tools 502 at initial positions. More specifically, the initial position of the clamping tool 502 is set with accuracy sufficient to the extent that light having a wavelength of 350 nm to 750 nm is incident on the light receiving element 174 in a state in which the linear sensor 170 is held with the clamping tools 502 and moved to the initial position. The tentative positioning of the linear sensor 170 can be performed while an output of the linear sensor is monitored when light having a wavelength from 350 nm to 750 nm is irradiated onto the concave surface reflection type diffraction grating.

(Adjustment of Position of Slit)

Next, the adjustment of the position of the slit 150 is described below. The adjustment of the position of the slit 150 is performed as follows. First, the linear sensor 170 is made abut against the adjustment surface 104. Then, the slit 150 is moved in a direction S of an optical axis of a light beam passing through the slit 150 in a state in which light having a predetermined wavelength is output from the monochromator 504 (omitted in FIG. 7A and illustrated in FIG. 7B). A light beam output from the monochromator 504 is irradiated onto the light guide optical member 140 from an upper part of the detection surface, which corresponds to the color patch surface. Then, the light beam passes through the slit 150 and is incident upon the concave surface reflection type diffraction grating 160. After reflected by the concave surface reflection type diffraction grating 160, the reflected light beam is received by the light receiving element 174 of the line sensor 170.

The slit 150 is moved while a spot shape formed on the light receiving element 174 of the linear sensor 170 is viewed, thus, a position, at which the spot shape (blurred shape of an image) is a desired shape, is determined. The adjustment of the spot shape utilizes the fact that a light source placed on the circumference of the Rowland circle R is conjugated with a spot (image) formed on the circumference of the Rowland circle R by a light beam which is incident from the light source to the concave surface reflection type diffraction grating 160 and reflected thereon. The adjustment of the spot shape is performed on cases where the wavelengths of light beams output from the monochromator 504 are 350 nm, 550 nm, and 750 nm.

The reason for performing the adjustment on light beams respectively having the above three wavelengths is that light having a wavelength in a range from 350 nm to 750 nm is detected by the light receiving element 174 the linear sensor 170. The light beams respectively having the above three wavelengths form images substantially at both ends and the center in the dispersing direction X of the light receiving element 174, among dispersed light beams to be detected by the linear sensor 170. Thus, when the adjustment of the position of the slit 160 is performed on the light beams respectively having the above three wavelengths such that the spot shapes are desired shapes, a spot formed from a light beam having each wavelength ranging from 350 nm to 750 nm can have a desired shape, even if the adjustment of the shape of the spot formed from a light beam is not performed on all light beams having wavelengths of the entire range from 350 nm to 750 nm. The optical axis L illustrated in FIG. 7B is that of a light beam having a wavelength of 550 nm.

(Adjustment of Position in Y-Axis Direction of Linear Sensor 170)

Next, adjustment of the position and the final positioning in the Y-axis direction of the linear sensor 170 are described below. In the adjustment of the position in the Y-axis direction of the linear sensor 170, the monochromator 504 outputs a light beam having a wavelength of 550 nm, which is a central wavelength of the LED 110 having a wavelength range from 350 nm to 750 nm, while the monochromator 504 outputs light beams. FIG. 8 is a graph illustrating an output of the light receiving element 174 versus the position in the Y-axis direction of the linear sensor 170 when the monochromator 504 outputs a light beam having a wavelength of 550 nm. An output from the light receiving element 174 is proportional to an amount of light received by the light receiving element 174.

First, the linear sensor adjustment tool 500 performs an operation of moving the linear sensor 170 by a predetermined distance in the Y-axis direction, and an envelope curve representing outputs of the light receiving device 174 is plotted. Then, the linear sensor 170 is moved to a central position between two positions at which an output value (Psl) of the light receiving element 174 is 50% of a maximum output value (Pmax).

(Adjustment of Position in X-Axis Direction of Linear Sensor 170)

Next, adjustment of the position and the final positioning in the X-axis direction of the linear sensor 170 are described below. According to the present embodiment, the positioning in the X-axis direction of the linear sensor 170 is performed after the positioning in the Y-axis direction thereof, however, it can be performed in the reverse order. FIG. 9A illustrates a relation between each pixel of the light receiving element 174 of the linear sensor 170 and an output therefrom. More particularly, an upper part of FIG. 9A schematically illustrates a state of the light receiving element 174 of the linear sensor 170, which is viewed from a direction perpendicular to the X-axis and the Y-axis. A lower part of FIG. 9A illustrates an output of each pixel of the above light receiving element 174. A spot A is formed on the light receiving element 174 of the linear sensor 170 by a light beam obtained by dispersing, with the concave surface reflection type diffraction grating 160, a light beam of a wavelength of 550 nm output by the monochromator 504. The linear sensor 170 is moved in the X-axis direction such that the light beam of wavelength of 550 nm is input to the central pixel in the arrangement direction (i.e., the X-axis direction) of the light receiving elements 174 arranged like an array. When the above-described movements in the X-axis direction and in the Y-axis direction of the linear sensor 170 are completed, the positioning of the linear sensor 170 is completed.

As described above, the adjustment surface 104 is provided substantially in parallel to the tangential line at a part of the Rowland circle R, at which the adjustment surface 104 intersects with a dispersed light beam received by the linear sensor 170. Thus, the present embodiment has the following advantages in the adjustment of the positions in the X-axis direction and the Y-axis direction of the linear sensor 170. More specifically, when the position of the linear sensor 170 is adjusted by moving the linear sensor 170 while abutting on the adjustment surface 104, the linear sensor 170 does not move in the direction of the radius of the Rowland circle R. For example, if the linear sensor 170 is moved in the X-direction as illustrated in FIG. 6, the light receiving surface S moves along the tangential line Rt. However, the light receiving surface S does not move in the direction of the radius Rr. Thus, the movement of the linear sensor 170 in the X-direction causes the light receiving surface S to move away from the Rowland circle R. Consequently, the image formation state of the dispersed light beam on the light receiving surface S is changed, and the spot shape is difficult to be deformed. Accordingly, according to the present embodiment, it is unnecessary for correcting the deformed spot shape to adjust the position of the slit 150 again.

(Association of Each Pixel of Linear Sensor with Dispersed Light Beam)

Next, each pixel of the light receiving element 174 is associated with a dispersed light beam. The adjustment is performed to associate the position of the light receiving element 174 with a spot position corresponding to each wavelength of light beam which is dispersed by the concave surface reflection type diffraction grating 160 and forms an image on the linear sensor in the wavelength range from 350 nm to 750 nm, which is an effective wavelength range of the LED 110. In other words, the adjustment is performed to associate the dispersing wavelength of the reflected light from a test material with each light receiving element of the linear sensor 170. More specifically, the adjustment is performed to recognize information concerning the position of each pixel of the light receiving element 174 corresponding to each wavelength.

The association is performed on the following three reference single-wavelength light beams respectively having a central wavelength of 550 nm, a short wavelength of 350 nm, and a long wavelength of 750 nm in the wavelength range from 350 nm to 750 nm, which is the effective wavelength range of the LED 110. Each of the single-wavelength light beams is output by the monochromator 504 and irradiated onto the detection surface corresponding to a color patch from above. Then, a dispersed light beam is detected by the linear sensor 170.

FIG. 9B is a graph illustrating an output of a pixel of the light receiving element 174 in a case where the monochromator 504 outputs one of the three single-wavelength light beams. At that time, the association is performed by setting a pixel (N) located at a central position between two pixels (N−1, N+1) at each of which an output value (Psl) of the light receiving element 174 is 50% of the maximum output value (Pmax) thereof as a pixel corresponding to the one of the three single-wavelength light beam. The association is performed to each of the above three single-wavelength light beams.

Next, association of a light beam having a wavelength other than the above-described three single wavelengths with a pixel is described below. FIG. 9C is a graph illustrating the relation each wavelength and the position of each pixel of the linear sensor. More particularly, FIG. 9C illustrates the association of wavelengths other than the above predetermined three single-wavelengths with the pixel positions. In the case of the light beam having the wavelength other than the above predetermined three single-wavelength light beams, the association can be performed by approximating the pixel position with a quadratic function based on information representing respective pixel positions of the three predetermined single-wavelengths. More specifically, the relation between the wavelength X and the pixel position Y at the linear sensor 170 can be approximated by the following quadratic function using coefficients a and b, and a constant c.

$$Y = aX^2 + bX + c \quad \text{(Expression 1)}$$

The relation between the wavelength and the pixel position concerning the above three predetermined single wavelengths is specified. Thus, the values of the coefficients a and b, and the constant c can be obtained by substituting specified values into X and Y in the expression 1. Consequently, the relation between the wavelength and the pixel position in the color sensor unit 1000 is found. Accordingly, it can be specified at which pixel position a dispersed light beam of an arbitrary wavelength ranging from 350 nm to 750 nm forms a spot. Thus, a light beam of an arbitrary wavelength dispersed by the concave surface reflection type diffraction grating 160 is associated with a pixel position of the light receiving element 174.

After performing such a sequence of adjustment processes, an ultraviolet curing adhesive 201 is applied between the convex portion 103 of the side wall 101 and the linear sensor 170, as illustrated in FIG. 5C described above. Then, the convex portion 103 and the linear sensor 170 are bonded to each other by irradiating ultraviolet light onto the adhesive. The convex portion 103 and the linear sensor 170 can be bonded before the association of each pixel of the light receiving element 174 with a dispersed light beam is performed.

As described above, according to the present embodiment, the linear sensor 170 is bonded and fixed to the side wall 101 of the housing 100 from the outside, so that a space around the linear sensor 170 can be opened. Thus, a space for using tools for assembling a device and for irradiating the light for curing a photocuring adhesive can easily be secured. Accordingly, process-design flexibility is enhanced, and workability is also enhanced.

According to the present embodiment, the adjustment surface 104 is provided on the side wall 101 substantially in parallel to the tangential line of the Rowland circle of the concave surface reflection type diffraction grating. The linear sensor 170 is bonded and fixed to the outer side of the side wall 101 in a state in which the linear sensor 170 abuts on the adjustment surface 104. Thus, if the apparatus is miniaturized, a space can sufficiently be secured for the tools used in the position adjustment of the linear sensor 170. Consequently, the linear sensor 170 can be assembled with high accuracy and without reducing workability and productivity.

However, when the adhesive is cured while the linear sensor 170 is bonded to the housing, the adhesive may be shrunk. Alternatively, according to environment in which the apparatus is installed, the cured adhesive may thermally be expanded. Thus, a deviation of the position of the linear sensor 170 may occur. According to the present embodiment, the convex portions 103 for bonding the linear sensor 170 are provided at positions at which the convex portions 103 face respectively both ends of the linear sensor 170 abutting on the adjustment surface 104 in the Y-direction. Thus, due to the shrinkage and the expansion of the adhesive, a deviation of the position in the Y-direction of the linear sensor 170 can more easily occur, as compared with a deviation of the position in the X-direction thereof. However, the width in the Y-direction of the light receiving element 174 has a margin to some extent for a dispersed light beam. Thus, even if the linear sensor 170 deviates in the Y-direction, an output of the light receiving element 174 is hard to change and colorimetric accuracy is little affected. If the linear sensor 170 deviates in the X-direction, there is a risk that a light beam having a wavelength of 550 nm cannot be input to the central pixel of the light receiving element 174.

According to the present embodiment, the convex portion 103 for bonding the linear sensor 170 is provided at a position in X-direction at which the convex portion 103 faces vicinity of the center of the light receiving element 174 of the linear sensor 170 that abuts on the adjustment surface 104. In other words, the light receiving element 174 is bonded to the side wall 101 at a single place close to the center in X-direction. Thus, even if the linear sensor 170 expands due to change of the environment, the position of the central pixel in the X-direction of the light receiving element 174 is difficult to deviate. The light receiving element 174 extends around the central pixel to both sides in the X-direction. At that time, in the light receiving element 174, the deviation is increased with increasing distance from the central pixel thereof, thus the position deviation is the largest at the pixel at the end.

On the other hand, if the linear sensor 170 is bonded to the adjustment surface 104 at a position facing to the pixel at one end in the X-direction of the linear sensor 170, the position deviation is the largest at the pixel at the other end thereof. Thus, when the linear sensor 170 is bonded at a position facing to the central pixel in the X-direction thereof, an absolute value of a deviation amount of the pixel can be reduced, as compared with a case of bonding the linear sensor 170 at a position facing to one end pixel in the X-direction. Accordingly, corresponding-relation between each pixel and a wavelength of a light beam received by the linear sensor 170 is difficult to be changed, and degradation of optical performance can be reduced.

Next, a second embodiment of the present invention is described below. Each component similar to that of the first embodiment is designated with the same reference numeral. Thus, description of such components is omitted.

According to the first embodiment, the linear sensor 170 is held outside the housing 100. Thus, the linear sensor 170 may be exposed to outside light. When the linear sensor 170 is exposed to outside light, the outside light may be incident upon the translucent glass portion 173 and the translucent sealing portion 172. Then, if the light receiving element 174 receives the outside light, there is a risk that noise appears in an output of the light receiving element 174, and that noise is erroneously detected. To solve such an issue, it is considered that light shielding is performed on outer surface of the glass portion 173 and the sealing portion 172 of the linear sensor 170. However, such a light shielding process may increase costs and time and is not preferable. Accordingly, in the second embodiment, countermeasures against outside light can be implemented more simply and surely. Hereinafter, a configuration according to the second embodiment is described.

FIG. 10 schematically illustrates how to hold the linear sensor 170 with the housing 100 according to the present embodiment. FIG. 10 illustrates the linear sensor 170, the flexible circuit board 175, and a holding member 180 arranged in an order of being attached to the housing 100, in which the apparatus is virtually exploded. FIG. 11A illustrates the holding member 180 attached to the housing 100, which is viewed from obliquely above. FIG. 11B illustrates the holding member 180 attached to the housing 100, which is viewed from obliquely below. The present embodiment is featured in that the linear sensor 170 is held by the holding member 180, the holding member 180 is bonded to the housing 100, and thus, the linear sensor 170 is attached to the housing 100. FIG. 12 is a cross-sectional diagram, taken on the line C-C' illustrated in FIG. 11A, illustrating the side wall 101 that holds the linear sensor 170 and the holding member 180.

First, a shape of the holding member 180 is described below. The holding member 180 for holding the linear sensor 170 is a box-shaped member that includes a back surface portion 180a for covering the back surface of the linear sensor 170 and a side surface portion 180b for covering each side surface of the linear sensor 170. The back surface of the linear sensor 170 is a back-side surface of a surface that abuts against the adjustment surface 104. The side surface of the linear sensor 170 is a side surface when the surface abutting against the adjustment surface 104 is regarded as a front surface. Aside of the holding member 180, to which the linear sensor 170 is attached, has an opening. In the state that the holding member 180 holds the linear sensor 170, a surface of the glass portion 173 slightly protrudes from the holding member 180. In addition, a concave portion 182 is provided on a part of the side surface portion 180a such that the flexible circuit board 175 extends to the outside of the holding member 180 to be able to be connected to the sensor unit control circuit board 120 in the state that the holding member 180 holds the linear sensor 170.

According to the present embodiment, the linear sensor 170 is attached to the housing 100 by bonding the holding member 180 to the housing 100, after the linear sensor 170 is first attached to the holding member 180. The attaching of the linear sensor 170 to the holding member 180 is described below. A hole 183 for applying the adhesive 201 for bonding the holding member 180 to the linear sensor 170 is provided in the holding member 180. The back surface of the linear sensor 170 is bonded to the holding member 180 with the adhesive 201 applied to the hole 183. However, there is variation of the orientation of the light receiving element 174 around a normal line to the light receiving surface S in the linear sensor 170. Thus, the position of the light receiving element 174 is measured by an observation camera (not illustrated). Then, the linear sensor 170 is bonded to the holding member 180 after the orientation of the linear sensor is adjusted to a desired orientation with respect to the holding member 180.

Next, the side wall 101 of the housing 100, to which the linear sensor 170 is attached, is described below. It is similar to the first embodiment that the opening portion 102 and the adjustment surface 104, on which the surface of the glass portion 173 of the linear sensor 170 abuts, are provided on the side wall 101. Further, the convex portion 103 protruding outwardly from the housing 100 is provided on the side wall 101. The convex portions 103 are provided around the holding member 180 to which the linear sensor 170 is bonded, and on both sides in the Y-axis direction of the holding member 180, and at a portion overlapping with the center in the X-axis direction of the light receiving element 174. The space between the holding member 180 and the convex portion 103 is filled with the adhesive 201 to bond the holding member 180 and the housing 100 to each other.

As illustrated in FIG. 12, the holding member 180 is shaped to cover most of the back surface and the side surfaces of the linear sensor 170. In a state in which the surface of the glass portion 173 abuts against the adjustment surface 104, the side surface portion 180b and the side wall 101 do not abut on each other. The side surface portion 180b does not completely cover the side surface of the linear sensor 170. However, the holding member 180 is shaped such that outside light performs multiple reflection between the side wall 101 and the holding member 180 and attenuates. Consequently, the risk of receiving the outside light by the light receiving element 174 is reduced.

The holding member 180 is fixed in a state in which the surface of the glass portion 173 abuts a part surrounding the opening portion 102 provided in the side wall 101 of the housing 100. Thus, a gap from which external air enters the housing 100 is blocked up. Accordingly, occurrence of stain due to the entry of dust such as paper powder can be prevented.

Next, a method for adjusting the position of the linear sensor 170 held by the holding member 180 is specifically described below with reference to FIG. 13. FIG. 13 illustrates the color sensor unit, which is viewed from obliquely above, at adjustment of the linear sensor 170. The adjustment of the position of the linear sensor 170 is performed by adjusting two axes, i.e., X-axis and Y-axis. A linear sensor adjustment tool 600 illustrated in FIG. 13 is configured by integrating clamping tools 601 for grasping the holding member 180, and urging tools 602 for urging and supporting the holding member 180 in the direction of an optical axis. The linear sensor adjustment tool 600 can be moved by a movement device (not shown) in the X-axis direction and the Y-axis direction in a state in which the tool 600 grabs the holding member 180 at left and right V-shaped cutout portions 184 thereof.

FIG. 13 also illustrates a monochromator 603. The adjustment of the position of the linear sensor 170 is performed as follows. First, the holding member 180 is grasped by the clamping tools 601. Then, the glass portion 173 of the linear sensor 170, which protrudes from the holding member 180, is made by the urging tool 602 to abut against the adjustment surface 104 formed on the side wall 101 of the housing 100. At that time, the substantially center of points supported by the clamping tools 601 and the center of gravity of the holding member 180 holding the linear sensor 170 are made to substantially coincide with each other. Consequently, the holding member 180 can be grasped in a stable state. It is similar to the first embodiment that the adjustment of the position of the linear sensor 170 is performed using the monochromator 603.

Upon completion of the position adjustment of the linear sensor 170, the space between the holding member 180 and the convex portion 103 provided on the holding member 180 and the side wall 101 is filled with the ultraviolet curing adhesive 201 by a dispenser 202. Then, the ultraviolet curing adhesive 201 is cured by being irradiated with ultraviolet. Thus, the holding member 180 and the linear sensor 170 are held by the side wall 101. According to the present embodiment, as illustrated in FIG. 13, a concave portion 103a is provided on the convex portion 103. Thus, the space can be filled with the ultraviolet curing adhesive 201 with the dispenser 202 from the Y-direction by providing the concave portion 103a in such a manner. Accordingly, interference with the linear sensor adjustment tool 600 is difficult to occur, and the adjustment is facilitated.

According to the present embodiment, the linear sensor 170 and the holding member 180 are attached to each other after the orientation of the linear sensor 170 around the normal line to the light receiving surface S is adjusted with respect to the holding member 180. Thus, the position of the light receiving element 174 with respect to a dispersed light beam output from the concave surface reflection type diffraction grating 160 can be determined with higher accuracy by adjusting the orientation around the normal line to the light receiving surface S in the above manner. The adjustment of the orientation around the normal line to the light receiving surface S can be also performed in a state in which the holding member 180 is grasped with the linear sensor adjustment tool 600, after the holding member 180 and the linear sensor 170 are attached to each other.

However, the adjustment of the orientation around the normal line to the light receiving surface S of the linear sensor 170 is relatively easy to preliminarily adjust the orientation before the holding member 180 and the linear sensor 170 are attached to each other, as compared with the case of adjusting the orientation in a state in which the holding member 180 is grasped with the linear sensor adjustment tool 600. Thus, time taken to perform the entire assembly process can be reduced. In addition, there is no necessity for providing the linear sensor adjustment tool 600 with a function of adjusting the orientation of the linear sensor 170 around the normal line to the light receiving surface S. Consequently, the tool can be simplified.

FIG. 14 illustrates another configuration of the holding member and the linear sensor adjustment tool. A holding member 185 is similar to that according to the second embodiment in the respect that the holding member 185 covers most of the back surface and the side surfaces of the linear sensor 170. However, the holding member 185 is formed of a composite member in which a steel plate 187 is attached to a plastic frame 186. Then, an electromagnet is used in a clamping portion 611 of a linear sensor adjustment tool 610. Thus, the holding member 185 can detachably be grasped. Two supporting columns 612 for supporting and positioning the holding member 185 with higher accuracy are arranged on the linear sensor adjustment tool 610. Thus, the linear sensor adjustment tool 610 is configured to engage the holding member 185 with high accuracy in a direction indicated by arrows illustrated in FIG. 14. The configuration of the holding member 185 can simplify the configuration of the linear sensor position adjustment tool 610.

FIG. 15 illustrates another configuration of vicinity of the adjustment surface 104 of the side wall 101. Particularly, FIG. 15 illustrates a position, at which the linear sensor 170 is attached, on the side wall 101 of the color sensor unit 1000, which is viewed from outside. As illustrated in FIG. 15, the adjustment surface 104 can be formed on the concave portion of the side wall 101. With this configuration, a wall surface 101a is formed so as not to abut against the holding member 180, as to face the periphery of the side surface portion 180b, and as to surround an outer side of the side surface portion 180b, in a state in which the linear sensor 170 held by the holding member 180 abuts against the adjustment surface 104. With such a configuration of the wall surface 101a, the risk of incidence of outside light upon the sealing portion 172 and the glass portion 173 can be more reduced. In addition, similar effects can be obtained by forming the wall surface 10a so as to be provided with ribs or the like, which don't abut against the adjustment holding member 180 and face and surround the side surface portion 180b. The wall surface 101a is formed with a sufficient distance to the holding member 180 so that the wall surface 101a does not abut against the holding member 180 even if the adjustment in each of X-direction and Y-direction of the linear sensor 170 is performed.

If the apparatus does not have the holding member 180 configured as described in the first embodiment, the wall surface 101a configured to surround an outer side of the linear sensor 170 can be formed similarly. In this case, the wall surface 101a is formed with a sufficient distance to the linear sensor 170 so that the wall surface 101a does not abut against the linear sensor 170 even if the adjustment in each of X-direction and Y-direction of the linear sensor 170 is performed. With such a configuration of the wall surface 101a, the risk of incidence of outside light upon the sealing portion 172 and the glass portion 173 can be more reduced.

According to the present embodiment, it is similar to the first embodiment that the holding member 180 for housing the linear sensor 170 is bonded and fixed to the side wall of the housing 100. Thus, even if the apparatus is miniaturized, a space for the tool at the adjustment of the position of the linear sensor 170 can sufficiently be secured. Consequently, the linear sensor 170 can be assembled with high accuracy and without reducing workability and productivity.

Further, according to the present embodiment, it is similar to the first embodiment that the holding member 180 covers most of the back surface and the side surfaces of the linear sensor 170. Thus, the risk of incidence of outside light upon the sealing portion 172 and the glass portion 173 of the lines sensor 170, and that of irradiation with the outside light onto the light receiving element 174 are reduced. Accordingly, the risk of occurrence of noise in an output of the light receiving element, and that of occurrence of erroneous detection can be reduced.

In a third embodiment of the present invention, a method for adjusting the position of the slit, which is described in the first embodiment, is described in detail below.
(Method for Adjusting Position of Slit)

A method of adjustment of the position of the slit 150 at assembly of the spectral colorimetric apparatus 1000 is described below. FIG. 16 illustrates the spectral colorimetric apparatus 1000 at adjustment of the position of the slit 150, which is viewed from obliquely above. At the assembly of the spectral colorimetric apparatus 1000, a monochromator for emitting predetermined single-wavelength light beams is used as the reference light source 504, in order to significantly know spectral performance, instead of using as the light source 110 of the white LED for emitting light which includes light beams of many wavelengths mixed with one another.

Light from the reference light source 504 is incident upon the light guide optical system, passes through the slit 150 and the concave surface reflection type diffraction grating 160, and forms an image as a slit image on the light receiving element 174 of the linear sensor 170. An L-axis illustrated in FIG. 16 is defined an axis that coincides with an optical axis L1 of a light beam which passes through the center 150b (see FIG. 19B) of an opening portion (slit portion) 150a (see FIG. 19B) of the slit 150, and is incident on the center of the spectral reflection surface 161 of the concave surface reflection type diffraction grating 160. The optical axis L1 is defined as an optical axis of the slit 150. If an imaginary surface configured by an opening edge of the slit opening portion 150a is regarded as an opening surface, according to the present embodiment, a perpendicular line to the opening portion center 150b of the opening surface coincides with the L-axis.

While the spectral reflection surface 161 of the opening of the slit 150 and the slit image on the light receiving element 174 according to the present embodiment are observed, the adjustment of the position in the L-axis direction (i.e., the S-direction illustrated in FIG. 7B) and the adjustment of rotation around the L-axis are performed. Deterioration of a state of formation of the slit image on the light receiving element 174 due to component accuracy, assembly errors or the like can be prevented by performing such slit adjustment. Thus, high colorimetric accuracy can be implemented. In the first embodiment, the adjustment of the position in the L-axis direction (i.e., the S-direction illustrated in FIG. 7B) is described. However, adjustment of rotation around the L-axis can be performed in view of required accuracy, if necessary.

FIG. 17 illustrates an output of a pixel of the light receiving element 174 on which a slit image is formed. The width in the dispersing direction X of each pixel of the light receiving element 174 is smaller than the width of the slit image. Thus, the slit image is formed over a plurality of pixels in the dispersing direction X. Thus, the spot width in the dispersing direction X of the slit image is defined as follows. More specifically, an envelope curve of an output of a pixel of the light receiving element 174 is plotted as illustrated in FIG. 17. When the envelope curve is sliced at a certain slicing level Psl with respect to a maximum value Pmax of the output, a distance between two intersection points on the envelope curve is defined as a spot width. According to the present embodiment, 50% of the maximum value Pmax of the output is set as the slicing level Psl.

FIG. 18A includes an upper part illustrating a manner in which a slit image is formed in an ideal image formation state from a single-wavelength light beam, and a lower part illustrating an output of the light receiving element 174 at that time. If an output of the light receiving element 174, as illustrated in FIG. 18A, can be obtained from a single-wavelength light beam, a highly accurate output can be obtained corresponding to each wavelength from a light beam dispersed by the concave surface reflection type diffraction grating 160. Thus, high colorimetric accuracy can be implemented.

If the positions of the optical members, such as the light guide optical system 140, the concave surface reflection type diffraction grating 160, and the linear sensor 170 on the housing 101 are determined as designed, an ideal image formation state illustrated in FIG. 18A can be obtained. However, the relation among the positions of the optical members are not established as designed, due to positioning errors and component accuracy, sometimes, an ideal image formation state cannot be obtained. Consequently, colorimetric accuracy is degraded. Each of FIGS. 18B and 18C includes an upper part illustrating a manner in which a slit image is formed in a non-ideal image formation state on the light receiving element 174 of the linear sensor 170 from a single-wavelength light beam, and a lower part illustrating an output of the light receiving element 174 at that time.

For example, if the concave surface reflection type diffraction grating 160 is deviated in the L-axis direction, an image formation position of a slit image is deviated. Thus, as illustrated in FIG. 18B, the slit image is thickened. Then, the slit image covers a larger number of pixels, as compared with the number of pixels covered by the slit image formed in the ideal image formation state. Thus, among dispersed light beams, a light beam having a certain wavelength is incident on a pixel on which a light beam having another wavelength is essentially incident thereon. Consequently, colorimetric accuracy is degraded.

For example, if the concave surface reflection type diffraction grating 160 rotates around the L-axis, or if the light receiving element 274 rotates around the optical axis L2, a slit image rotates, as illustrated in FIG. 18C. Then, the slit image covers a larger number of pixels, as compared with the number of pixels covered by the slit image formed in the ideal image formation state. Thus, it is similar to the case illustrated in FIG. 18B that, among dispersed light beams, a light beam having a certain wavelength is incident on a pixel on which a light beam having another wavelength is essentially incident thereon. Consequently, colorimetric accuracy is degraded.

The adjustment is performed by moving the slit 150 in the L-axis direction and rotating the slit 150 around the L-axis so that the slit image is formed in the above ideal image formation state.

(Configuration for Adjustment of Slit Position)

Next, a configuration for slit adjustment is described below. FIG. 19A is a perspective view illustrating a portion in vicinity of the slit 150 in the spectral colorimetric apparatus 1000. FIG. 19B is a cross-sectional diagram, taken from a direction indicated by the arrow B illustrated in FIG. 19A, illustrating the vicinity of the slit 150 in the spectral colorimetric apparatus 1000. The slit 150 includes the opening portion 150a through which a light beam being incident on the slit 150 passes. According to the present embodiment, the slit 150 is cylindrically shaped around the center 150b in the longitudinal direction of the opening portion 150a. Further, the slit 150 includes a slide surface (hereinafter referred to as a sliding surface) 150c, which is a surface parallel to the L-axis, and a bonding surface 150d on an outer circumferential surface thereof.

The housing 100 is provided with guide surfaces 100b and 100c and a fixed surface 100a, which are surfaces parallel to the L-axis. The guide surface (first guide surface) 100b and the guide surface (second guide surface) 100c are arranged to form V-shaped when viewed from the L-axis direction. Although described in detail below, the adjustment of the position and orientation of the slit 150 is performed in a state in which the sliding surface 150c abuts against the guide surfaces 100b and 100c. In other words, the guide surfaces 100b and 100c function as adjustment surfaces for the slit 150, and the sliding surface 150c functions as an abutment surface that abuts on the guide surfaces 100b and 100c.

A minute gap to be filled with an adhesive is provided between the bonding surface 150d and the fixed surface 100a. Upon completion of the adjustment, the adhesive filled in the gap between the fixed surface 100a and the bonding surface 150d is cured. Thus, the slit 150 is bonded and fixed to the housing 100. According to the present embodiment, the sliding surface 150c abuts against each of the guide surfaces 100b and 100c, and the bonding surface 150d is bonded to the fixed surface 100a. The abutment between the surfaces, and the bonding between the surfaces according to the present invention are not limited thereto. In short, it is sufficient that the abutment and the bonding are performed on surfaces parallel to the L-axis. Thus, the sliding surface 150c and the bonding surface 150d can be the same surface.

The adjustment of the slit is performed in a state in which the slit 150 is grasped by a tool (not illustrated) and the sliding surface 150 abuts against the guide surfaces 100b and 100c while single-wavelength light beams are output from the monochromator as the reference light source 504. First, the slit is moved in the L-axis direction, so that the position thereof is determined. More specifically, the slit 150 is moved in the L-axis direction to a position at which the spot width is narrowest.

When the spot width is the narrowest, the apparatus is in a state in which the slit opening portion 150a is located on the Rowland circle R, so that an amount of light beams dispersed and condensed by the concave reflection type diffraction grating 160 is maximized. In this state, an amount of light beams received by the light receiving element 107 is largest. Thus, an output of the light receiving element 107 is highest. According to the present embodiment, light beams respectively having wavelengths of 450 nm, 550 nm, and 650 nm are output from the monochromator. Then, the position of the slit 150 in the L-axis direction is determined at an average position of positions at which the spot widths corresponding to the respective wavelengths are narrowest. If the coordinates of the slits respectively corresponding to the above three wavelengths in the L-axis direction are defined as L1, L2, and L3, the coordinates of the average position can be given by the expression (L1+L2+L3)/3.

Thus, according to the present embodiment, the position of the slit is determined at the average position of the positions at which the spot width becomes narrowest with respect to the light beams having three wavelengths which are condensed to the center and both sides of the center in the dispersing direction X of the light receiving element 174 of the linear sensor 170. Accordingly, the width of a spot formed from each light beam condensed onto the light receiving element 174 can be determined with high accuracy. The wavelengths of the light beams output from the monochromator are not limited to 450 nm, 550 nm, and 650 nm. Other wavelengths can be used, as long as such wavelengths are those of light beams condensed onto the center and both sides of the center in the dispersing direction X. The position of the slit can be determined at an average of four or more positions respectively corresponding to such wavelengths.

Next, the slit 150 is rotated around the L-axis. The slit 150 is rotated around the center 150b serving as the center of rotation. Then, the orientation of the slit 150 is set such that the spot width is narrowest. At that time, a light beam having a wavelength of 550 nm is output from the monochromator. According to the present embodiment, the narrowest spot width corresponds to the width of about three pixels of the light receiving element 174. Thus, a slit image can be formed in the ideal image formation state on the light receiving element 174 by adjusting the position in the L-axis direction of the slit 150 and the orientation of the slit 150 around the L-axis.

The adjustment of rotation around the L-axis of the slit 150 can be performed by employing average of orientations at which the spot width is narrowest with respect to the light beams having three wavelengths, similarly to the adjustment of the position in the L-axis direction thereof.

In the present embodiment, all of the sliding surface 150c and the guide surfaces 100b and 100c are surfaces parallel to the L-axis. The slit 150 is moved in the L-axis direction by making both of the guide surfaces 100b and 100c abut against the sliding surface 150c. Thus, the slit 150 can be prevented from moving in a direction other than the L-axis direction, and the adjustment of the position of the slit 150 can be performed with high accuracy. The sliding surface 150c according to the present embodiment is a circular arc surface formed by causing a circular arc centered at the center 150b in the longitudinal direction of the opening portion 150a to move in the L-axis direction. In other words, the sliding surface 150c has a circular arc shape centered at the center 150b in the longitudinal direction of the opening portion 150a, when viewed from the direction of the L-axis. The guide surfaces 100b and 100c serve as tangential lines that touch the slide surface 150c having the circular arc shape, and abut against the sliding surface 150c to interpose the sliding surface 150c therebetween. Thus, even when the slit 150 is rotated around the L-axis, the center 150b of the slit 150 can be placed at a fixed position. Consequently, the slit 150 can be prevented from moving in a direction other than the direction of rotation around the L-axis, which is an adjustment direction. Accordingly, the adjustment of the slit can be achieved with high accuracy.

FIGS. 20A and 20B illustrate vicinity of the slit 150 of the spectral colorimetric apparatus 100, which is viewed from above. As illustrated in FIG. 20A, both of the bonding surface 150d and the fixed surface 100a according to the present embodiment are surfaces substantially parallel to the L-axis. The distance between the slit 150 and the housing 100 is set to be uniform in the L-axis direction. The distance between the bonding surface 150d and the fixed surface 100a can be set to be uniform, independent of the position of the slit 150 in the L-axis direction.

If the distance between the slit 150 and the housing 100 is not uniform in the L-axis direction, like the distance between a bonding surface 150d' and a fixed surface 100a' as illustrated in FIG. 20B, the following issues occur. More specifically, although a space between the slit 150 and the housing 100 is filled with an adhesive 112 and then the adhesive 112 is cured, a layer of the adhesive 112 is shrank when cured. In some installation environment of the apparatus, the layer of the adhesive 112 may be thermally expanded. At that time, in a configuration illustrated in FIG. 20B, an adhesive layer 112' is not uniform in the L-axis direction in thickness. Thus, the slit 150' may vary, as indicated by an arrow R, due to unbalance between tensile forces Fa and Fb, which is caused by cure shrinkage. When the adhesive layer 112 is thermally expanded, the slit 150' varies in the opposite direction.

On the other hand, according to the present embodiment, as illustrated in FIG. 20A, the adhesive layer 112 is set to be uniform in the L-axis direction. Consequently, the slit 150 can be prevented from moving in the L-axis direction due to cure shrinkage or thermal expansion.

FIG. 21 is a cross-sectional diagram, taken from the arrow B illustrated in FIG. 19A, illustrating vicinity of the slit of the spectral colorimetric apparatus. The bonding surface 150d is an outer circumferential surface of a cylinder centered at the center 150b in the longitudinal direction of the opening portion 150a. Thus, even when the slit 150 is rotated around the L-axis, the distance between the bonding surface 150d and the fixed surface 100a does not change. If the bonding surface 150d is not the outer circumferential surface of the cylinder centered at the center 150b in the longitudinal direction of the opening portion 150a, the distance therebetween changes. If the distance therebetween changes, the thickness of the adhesive layer 112 is changed. Thus, when the adhesive is cured, an amount of shrinkage thereof is change. After the cure of the adhesive layer 112, the position of the slit 150 may vary with the orientation thereof around the L-axis. Consequently, the apparatus cannot stably be manufactured.

According to the configuration of the present embodiment, the bonding surface 150d is the outer circumferential surface centered at the center 150b in the longitudinal direction of the opening portion 150a. Thus, even when the adjustment of rotation is performed, the distance between the fixed surface 100a and the bonding surface 150d does not change. Consequently, the thickness of the adhesive layer 112 is difficult to change. Accordingly, change in the amount of cure shrinkage of the adhesive 112 or in the amount of thermal expansion thereof can be prevented from occurring due to change in thickness of the adhesive layer 112, which is caused by performing the adjustment of rotation.

According to the present embodiment, the number of a bonding place is set to be one. However, more preferably, another similar bonding place is provided at the opposed side across the slit 150, so that the slit 150 is interposed between the adhesive layers 112. With this configuration, forces for changing the position of the slit 150 due to the cure shrinkage of the adhesive are canceled out. Thus, the variation in position of the slit 150 due to the cure shrinkage of the adhesive can be restrained.

The slit 150 according to the present embodiment includes the opening portion 150a and the cylindrical portion 150c which are formed integrally with each other. However, the configuration of the slit according to the present invention is not limited thereto. A member including the opening portion can be separated from a member including the cylindrical portion.

Thus, according to the present embodiment, the slit 150 abuts against the guide surfaces 100b and 100c serving as the adjustment surfaces, so that the position in the direction of the optical axis of the slit 150 can be adjusted. Consequently, the position and orientation of the slit can be adjusted with high accuracy. In addition, the degradation of the image formation state of the slit image due to the component accuracy, assembly errors, and the like of the slit 150, the concave surface reflection type diffraction grating 160 and the light receiving element 107 can be prevented by such adjustment.

Next, a fourth embodiment of the present invention is described below. Components of the spectral colorimetric apparatus 1000 other than a slit 2150 and a housing 2100 are similar to those according to the first embodiment in shapes and functions. Thus, the components are designated with the same reference numerals in the first embodiment, and the description thereof is omitted. According to the first embodiment, the position adjustment in the L-axis direction of the slit and the rotation adjustment thereof around the L-axis are performed. However, if rotation of a slit image on the light receiving element due to positioning errors and component accuracy falls within an allowable range, the adjustment of rotation of the slit around the L-axis is unnecessary. Thus, it has only to perform the adjustment of the position in the L-axis direction of the slit. Regarding the fourth embodiment, a configuration of the apparatus capable of performing, if only the adjustment of the position in the L-axis direction of the slit is performed as the adjustment of the slit, adjustment of the position of the slit with high accuracy is described below.

FIG. 22 illustrates the spectral colorimetric apparatus 1000 from which a cover is removed, which is viewed from obliquely above. FIG. 23A is a schematic diagram illustrating a slit 2150. FIG. 23B is a cross-sectional diagram, taken from a direction indicated by the arrow C illustrated in FIG. 22, illustrating vicinity of the slit of the spectral colorimetric apparatus. The slit 2150 includes an opening portion 2150a through which incident light passes, and sliding surfaces 2150b and 2150c that are surfaces parallel to the L-axis and provided on an outer circumferential surface thereof. Guide surfaces 2100b and 2100c that are surfaces parallel to the L-axis are formed in the housing 2100.

The slit 2150 is moved in the L-axis direction while the sliding surface 2150b and the sliding surface 2150c abut on the guide surface 2100b and the guide surface 2100c respectively. Thus, it is similar to the first embodiment that the slit 2150 can be adjusted in the L-axis direction with high accuracy. In addition, according to the present embodiment, the sliding surfaces 2150b and 2150c are formed as flat surfaces and abut against the guide surfaces 2100b and 2100c respectively. Consequently, an angle of the slit 2150 around the L-axis with respect to the housing 2100 is uniquely determined. Accordingly, the slit 2150 can be moved stably.

According to the first embodiment, two-direction adjustment of the slit, i.e., the movement in the L-axis direction and the rotation around the L-axis are performed. Further, the slit is fixed to the housing the adhesive. However, according to the present embodiment, the slit 2150 can be fixed by performing only one-direction adjustment, i.e., only the adjustment of position in the L-axis direction of the slit. Thus, the slit 2150 is fixed onto the housing 2100 with an urging member 126 such as a plate spring. The number of components is increased using the urging member 126. However, the assembly process of filling and curing of the adhesive can be eliminated. Consequently, the apparatus can simply be assembled.

In addition, the slit and the housing can be formed into shapes as illustrated in FIGS. 24A and 24B, respectively. FIG. 24A is a schematic diagram illustrating a slit 3150. FIG. 24B is a diagram corresponding to a cross-sectional diagram, taken from a direction of the arrow C illustrated in FIG. 22, illustrating a neighborhood portion of a slit in a spectral colorimetric apparatus. The slit 3150 illustrated in FIGS. 24A and 24B has a configuration basically similar to that of the slit 2150 illustrated in FIG. 23. However, the slit 3150 illustrated in FIGS. 24A and 24B is provided with an engagement portions 3150d having a concave shape engaged with a tool so as to be easily held by the tool. In addition, as illustrated in FIG. 24B, the guide surface 2100b abutting on the sliding surface 3150b can be configured by being divided into two parts like rails. Thus, the guide surface 2100b is formed like rails, so that an angle of the slit 3150 around the L-axis with respect to the housing 2100 can be determined with higher accuracy.

In the configuration illustrated in FIGS. 24A and 24B, tapered portions 2100d are formed on the housing 2100. The slit 3150 is bonded to the housing 2100 by filling with an adhesive spaces indicated by arrows in vicinity of the tapered portions 2100d. Thus, the tapered portions 2100d are provided, so that when the spaces are filled with the adhesive, the adhesive is accumulated in each space between the tapered portion 2100d and the slit 3150. Thus, the contact area between the adhesive and the housing 2100, and the contact area between the slit 3150 and the adhesive are increased. Consequently, the slit 3150 can more firmly be fixed to the housing 2100.

Thus, the fourth embodiment can adjust the position of the slit with high accuracy, similarly to the third embodiment. With such adjustment, the degradation of the image formation state due to the component accuracy and the assembly errors of the slit 150, the concave surface reflection type diffraction grating 160, and the light receiving element 107 can be prevented.

While the present invention has been described with reference to embodiments, it is to be understood that the invention is not limited to the disclosed embodiments.

What is claimed is:

1. A spectral colorimetric apparatus comprising:
   a concave surface reflection type diffraction element configured to disperse an incident light beam;
   a sensor including a plurality of photoelectric conversion elements; and
   a support member that supports the plurality of photoelectric conversion elements, wherein the plurality of photoelectric conversion elements is arranged in a direction parallel to a tangential line of a Rowland circle of the concave surface reflection type diffraction element and each configured to receive the light beam dispersed by the concave surface reflection type diffraction element;
   a housing configured to support the concave surface reflection type diffraction element and the sensor; and
   a bonding portion provided on the housing, wherein the support member is fixed to the housing with an adhesive provided between the bonding portion and the support member,
   wherein the bonding portion is provided only at a position corresponding to a center of the plurality of photoelectric conversion elements of the sensor in the direction in which the plurality of photoelectric conversion elements is arranged.

2. The spectral colorimetric apparatus according to claim 1, wherein the housing includes a side wall in which an opening portion is formed, and the sensor is supported on an outer side of the side wall of the housing so as to receive a light beam which is dispersed by the concave surface reflection type diffraction element and passes through the opening portion.

3. The spectral colorimetric apparatus according to claim 2, wherein the bonding portion is a protrusion protruding from the side wall out of the housing.

4. An image forming apparatus comprising:
   an image forming device configured to form a toner image on a conveyed sheet material;
   a fixing unit provided in the image forming device and configured to heat the sheet material;
   a concave surface reflection type diffraction element configured to disperse an incident light beam;
   a sensor including a plurality of photoelectric conversion elements, wherein the plurality of photoelectric conversion elements is arranged in a direction parallel to a tangential line of a Rowland circle of the concave surface reflection type diffraction element and each configured to receive the light beam dispersed by the concave surface reflection type diffraction element;
   a housing configured to support the concave surface reflection type diffraction element and the sensor; and
   a bonding portion provided on the housing, wherein the sensor is fixed to the housing with an adhesive provided between the bonding portion and the sensor,
   wherein the housing is arranged at a position where a reflection light beam reflected by a sheet material at a downstream position of the fixing unit in a direction in which the sheet material is conveyed is received by the plurality of photoelectric conversion elements,
   wherein an image forming condition for the image forming device is controlled based on an output of the plurality of photoelectric conversion elements, and
   wherein the bonding portion is provided only at a position corresponding to a center of the plurality of photoelectric conversion elements of the sensor in the direction in which the plurality of photoelectric conversion elements is arranged.

5. The image forming apparatus according to claim 4, wherein the housing includes a side wall in which an opening portion is formed, and the sensor is supported on an outer side of the side wall of the housing so as to receive a light beam which is dispersed by the concave surface reflection type diffraction element and passes through the opening portion.

6. The image forming apparatus according to claim 5, wherein the bonding portion is a protrusion protruding from the side wall out of the housing.

7. The image forming apparatus according to claim 4, further comprising:
   a cover configured to cover the housing,
   wherein the cover includes a cover portion configured to cover a portion of the side wall to support the sensor from an outside of the housing.

8. The image forming apparatus according to claim 4, wherein the plurality of photoelectric conversions element is configured to receive a reflection light beam reflected by an image of mixed color formed on the sheet material.

* * * * *